(12) United States Patent
Geng et al.

(10) Patent No.: US 11,102,706 B2
(45) Date of Patent: *Aug. 24, 2021

(54) METHOD AND DEVICE FOR SENDING SYSTEM INFORMATION

(71) Applicant: Huawei Technologies Co., Ltd., Shenzhen (CN)

(72) Inventors: Tingting Geng, Shanghai (CN); Hongping Zhang, Shanghai (CN); Yalin Liu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,022

(22) Filed: Jul. 31, 2019

(65) Prior Publication Data
US 2019/0364485 A1   Nov. 28, 2019

Related U.S. Application Data

(63) Continuation of application No. 16/271,543, filed on Feb. 8, 2019, which is a continuation of application No. PCT/CN2017/096635, filed on Aug. 9, 2017.

(30) Foreign Application Priority Data

Aug. 9, 2016   (CN) .......................... 201610649587.8

(51) Int. Cl.
*H04W 72/14*   (2009.01)
*H04W 48/10*   (2009.01)
(Continued)

(52) U.S. Cl.
CPC ....... *H04W 48/10* (2013.01); *H04W 52/0216* (2013.01); *H04W 72/005* (2013.01);
(Continued)

(58) Field of Classification Search
CPC .......................... H04W 48/10; H04W 72/005; H04W 52/0216
See application file for complete search history.

(56) References Cited

U.S. PATENT DOCUMENTS 8,467,329 B2 * 6/2013 Lee ........................ H04W 48/12
370/312
9,253,796 B2 * 2/2016 Diachina ................ H04W 72/14
(Continued)

FOREIGN PATENT DOCUMENTS

CN   101207844 A   6/2008
CN   101212795 A   7/2008
(Continued)

OTHER PUBLICATIONS

US 10,588,061 B2, 03/2020, Mochizuki (withdrawn)*
(Continued)

*Primary Examiner* — Parth Patel
(74) *Attorney, Agent, or Firm* — Leydig, Voit & Mayer, Ltd.

(57) ABSTRACT

Embodiments of the present invention relate to the communications field, and provide a method and device for sending system information. The method comprises: a terminal receives a broadcast message from a network device, the broadcast message comprises indication information for an system information (SI) and wherein that the indication information is for indicating that whether the SI is being broadcasted or not, in case that the indication information indicating that the SI is not being broadcasted, the terminal sends a system information request to the network device for acquiring the SI.

13 Claims, 9 Drawing Sheets

(51) Int. Cl.
*H04W 52/02* (2009.01)
*H04W 72/00* (2009.01)
*H04W 72/04* (2009.01)
*H04W 72/12* (2009.01)
*H04W 48/14* (2009.01)

(52) U.S. Cl.
CPC ..... *H04W 72/0446* (2013.01); *H04W 72/121* (2013.01); *H04W 48/14* (2013.01)

(56) References Cited

U.S. PATENT DOCUMENTS

| | | | |
|---|---|---|---|
| 10,200,920 B2* | 2/2019 | Kubota | H04W 48/12 |
| 10,420,066 B2* | 9/2019 | Sadeghi | H04W 68/02 |
| 10,455,621 B2* | 10/2019 | Agiwal | H04W 74/0833 |
| 2005/0190712 A1 | 9/2005 | Lee et al. | |
| 2008/0039083 A1 | 2/2008 | Muniere et al. | |
| 2010/0027466 A1* | 2/2010 | Mustapha | H04J 11/0069 370/328 |
| 2012/0093095 A1* | 4/2012 | Barbieri | H04W 72/0426 370/329 |
| 2012/0250501 A1* | 10/2012 | Lee | H04W 4/90 370/229 |
| 2013/0077582 A1 | 3/2013 | Kim et al. | |
| 2013/0294374 A1 | 11/2013 | Li et al. | |
| 2014/0187224 A1* | 7/2014 | Liu | H04W 24/02 455/418 |
| 2015/0163730 A1* | 6/2015 | Zhang | H04W 48/16 370/329 |
| 2015/0181624 A1* | 6/2015 | Hwang | H04W 74/0841 370/329 |
| 2015/0256995 A1* | 9/2015 | Rune | H04W 8/186 455/418 |
| 2015/0271675 A1* | 9/2015 | Cheng | H04W 8/005 455/410 |
| 2015/0382284 A1 | 12/2015 | Brismar et al. | |
| 2016/0007149 A1* | 1/2016 | Muhonen | H04W 4/02 455/456.1 |
| 2016/0073326 A1* | 3/2016 | Vannithamby | H04W 48/12 370/312 |
| 2016/0174100 A1* | 6/2016 | Diachina | H04W 72/14 370/230 |
| 2016/0234736 A1* | 8/2016 | Kubota | H04W 36/0083 |
| 2016/0242206 A1* | 8/2016 | Ohlsson | H04W 72/1231 |
| 2016/0323852 A1* | 11/2016 | Golitschek Edler von Elbwart | H04L 1/1887 |
| 2016/0337817 A1* | 11/2016 | Malladi | H04W 4/06 |
| 2016/0374109 A1* | 12/2016 | Rico Alvarino | H04H 20/16 |
| 2017/0034767 A1* | 2/2017 | Griot | H04W 48/10 |
| 2017/0048920 A1* | 2/2017 | Kim | H04W 4/70 |
| 2017/0251500 A1* | 8/2017 | Agiwal | H04W 74/0833 |
| 2017/0265165 A1* | 9/2017 | Li | H04W 48/10 |
| 2017/0280382 A1* | 9/2017 | Radulescu | H04W 74/0833 |
| 2017/0303240 A1* | 10/2017 | Basu Mallick | H04W 72/02 |
| 2017/0311285 A1* | 10/2017 | Ly | H04W 74/0833 |
| 2017/0367075 A1* | 12/2017 | Liu | H04W 72/04 |
| 2018/0013524 A1* | 1/2018 | Chien | H04W 48/12 |
| 2018/0035361 A1* | 2/2018 | Ishii | H04W 48/10 |
| 2018/0049060 A1* | 2/2018 | Fujishiro | H04W 4/06 |
| 2018/0077612 A1* | 3/2018 | Zheng | H04W 76/27 |
| 2018/0098224 A1* | 4/2018 | Sun | H04W 72/0413 |
| 2018/0103400 A1 | 4/2018 | Mochizuki et al. | |
| 2018/0124598 A1* | 5/2018 | Zeng | H04W 12/08 |
| 2018/0139586 A1* | 5/2018 | Park | H04W 4/06 |
| 2018/0227833 A1* | 8/2018 | Belleschi | H04W 36/32 |
| 2018/0310235 A1* | 10/2018 | You | H04W 72/04 |
| 2019/0045429 A1* | 2/2019 | Koskinen | H04B 17/318 |
| 2019/0116578 A1* | 4/2019 | Tang | H04W 4/20 |
| 2019/0141578 A1* | 5/2019 | Tang | H04W 28/18 |
| 2019/0141746 A1* | 5/2019 | Hong | H04W 74/0833 |
| 2019/0150069 A1 | 5/2019 | Mustapha | |
| 2019/0158988 A1* | 5/2019 | Lee | H04W 76/27 |
| 2019/0159110 A1* | 5/2019 | Takahashi | H04W 48/10 |
| 2019/0174398 A1* | 6/2019 | Geng | H04W 72/005 |
| 2019/0174554 A1* | 6/2019 | Deenoo | H04W 56/001 |
| 2019/0223082 A1* | 7/2019 | He | H04W 4/06 |
| 2019/0223094 A1* | 7/2019 | Ingale | H04W 68/005 |
| 2019/0268830 A1* | 8/2019 | Kim | H04W 36/0072 |
| 2019/0274091 A1 | 9/2019 | Tang | |
| 2019/0289533 A1* | 9/2019 | Kim | H04W 48/16 |
| 2019/0297597 A1* | 9/2019 | Zhao | H04L 1/00 |
| 2019/0297598 A1* | 9/2019 | Li | H04W 72/005 |
| 2019/0349840 A1* | 11/2019 | Zhang | H04W 76/18 |
| 2020/0146075 A1* | 5/2020 | Agiwal | H04W 74/0833 |

FOREIGN PATENT DOCUMENTS

| | | |
|---|---|---|
| CN | 101217689 A | 7/2008 |
| CN | 103179513 A | 6/2013 |
| CN | 107623937 A | 1/2018 |
| JP | 2010506434 A | 2/2010 |
| RU | 2378795 C2 | 1/2010 |
| RU | 2392742 C2 | 6/2010 |
| WO | 2014129951 A1 | 8/2014 |
| WO | 2017150863 A1 | 9/2017 |
| WO | 2018016922 A1 | 1/2018 |

OTHER PUBLICATIONS

"System Information Signalling Design in NR," 3GPP TSG-RAN WG2 Meeting #94, Nanjing, China, R2-163371, pp. 1-7, 3rd Generation Partnership Project, Valbonne, France (May 23-27, 2016).

"System Information Acquisition for New Radio Access," 3GPP TSG-RAN WG2 #94, Nanjing, China, Tdoc R2-164088, pp. 1-5, 3rd Generation Partnership Project, Valbonne, France (May 23-27, 2016).

U.S. Appl. No. 16/271,543, filed Feb. 8, 2019.

"3rd Generation Partnership Project; Technical Specification Group Radio Access Network; Evolved Universal Terrestrial Radio Access (E-UTRA); Radio Resource Control (RRC); Protocol specification (Release 9)," 3GPP TS 36,331 V9.3.0, pp. 1-250, 3rd Generation Partnership Project, Valbonne, France (Jun. 2010).

* cited by examiner

METHOD AND DEVICE FOR SENDING SYSTEM INFORMATION

CROSS-REFERENCE TO RELATED APPLICATIONS

This application is a continuation of U.S. application Ser. No. 16/271,543, filed on Feb. 8, 2019, which is a continuation of International Application No. PCT/CN2017/096635, filed on Aug. 9, 2017, which claims priority to Chinese Patent Application No. 201610649587.8, filed on Aug. 9, 2016. All of the afore-mentioned patent applications are hereby incorporated by reference in their entireties.

TECHNICAL FIELD

Embodiments of the present invention relate to the communications field, and in particular, to method and device for sending system information.

BACKGROUND

After user equipment (UE) performs cell search, the UE has been synchronized with a cell in downlink, and may acquire a physical cell ID (PCI) of the cell and detect a timeslot of a frame. Then, the UE needs to acquire system information of the cell, to access the cell and work properly in the cell. The system information is cell-level information, in other words, the system information takes effect for all UEs that access the cell.

Generally, system information may be classified into two types: one is important system information (SI), and the other is system information (On-demand SI) that is sent on demand. The important system information may be periodically broadcasted by a network side. This type of system information, such as a master information block (MIB), access information, and prohibition information, or information related to a camped cell, must be acquired by UE in idle mode, or needs to be used when the UE accesses a cell. The on-demand SI may being broadcasted in a relatively long period by the network side, or may not being periodically broadcasted but is sent on demand of the UE. This type of system information may be specifically sent to the UE by using dedicated signaling, for example, system information related to a broadcast multicast service (MBMS).

In other words, the network side actively broadcasts only the important SI. When the UE needs to acquire the on-demand SI, the UE sends a request that carries the required SI information to the network side. Then, the network side notifies the UE of the on-demand SI by using dedicated signaling. In this way, the network side broadcasts the on-demand SI according to the requirement of the UE. This can improve utilization of common resources and reduce power consumption of the UE side. However, when a plurality of UEs require same on-demand SI at the same time, and the network side occupies more network time-frequency resource(s) to send dedicated signaling carrying the required on-demand SI to each of the plurality of UEs, network time-frequency resource(s) waste is caused.

SUMMARY

Embodiments of the present invention provide a method and device for sending system information, so as to resolve a problem of wasting network time-frequency resource(s) caused by using a plurality of pieces of dedicated signaling to send system information.

A first aspect provides a method for sending system information, including: receiving, by a network-side device, a system information request sent by user equipment UE, where the system information request is used to request to acquire first system information from the network-side device; sending, by the network-side device, a group identifier to the UE, or sending, by the network-side device, a group identifier and time-frequency resource(s) for the first system information to the UE; and sending, by the network-side device, the first system information to the UE. The network-side device may be a base station. When the UE receives the group identifier (Group ID) or the group ID and the time-frequency resource(s) sent by the base station, the UE may descramble the time-frequency resource(s) by using the group ID. The base station may send, in a multicast manner, the first system information to the UE that requests the first system information. In this way, when a plurality of UEs request the first system information, the base station does not need to send the first system information to each UE by using dedicated signaling, and may send the first system information in a multicast manner. Compared with a manner of sending the first system information by using dedicated signaling, the multicast manner may save network time-frequency resource(s).

In a possible design, the method further includes: sending, by the network-side device, a first broadcast message, where the first broadcast message includes indication information for on-demand system information, and the indication information includes indication information for the first system information. For example, the base station may periodically send the first broadcast message, so that UE that newly enters a cell covered by the base station receives indication information of on-demand SI in time, and further requests any on-demand SI from the base station when the UE requires the on-demand SI.

In a possible design, the indication information includes an index for the system information, or the indication information includes an index and a value tag (VT) for the system information, or the indication information includes an index and a value tag for the system information, and a common value tag of at least two pieces of system information. The value tag is used by the UE to determine whether content of the system information changes, in other words, the UE may compare a VT in the system information sent by the base station with a VT for the system information saved by the UE to determine whether to update the content of the system information.

In a possible design, the indication information includes a bitmap, and a value of each bit in the bitmap is used to indicate whether system information corresponding to each bit needs to be acquired by the UE by sending a system information request. For example, values corresponding to each bit in the bitmap is 0011, 0 indicates that the UE does not need to send the system information request to acquire the corresponding SI from the base station, and 1 indicates that the UE needs to send the system information request to acquire the corresponding SI from the base station.

In a possible design, the system information request includes an index for the first system information, or the system information request includes an index and a value tag for the first system information. When the system information request includes the VT, the base station may compare the VT in the received system information request with a VT of first system information saved on the base station side, to determine whether to send the first system information to the UE.

In a possible design, when the system information request includes the index and the value tag for the first system information, before the sending, by the network-side device, a group identifier to UE, or sending, by the network-side device, a group identifier and time-frequency resource(s) for the first system information to the UE, the method further includes: determining, by the network-side device, whether the value tag for the first system information sent by the UE is the same as a value tag of first system information saved by the network-side device; and if it is determined that the value tags are different, determining, by the network-side device, that content of the first system information has been updated. This can save network resources and the system information is not repeatedly sent.

In a possible design, the method further includes: if it is determined that the value tags are the same, sending, by the network-side device, an acknowledgment ACK message to the UE, so as to indicate the UE to continue to use the first system information saved by the UE.

In a possible design, the sending, by the network-side device, a group identifier to the UE includes: preconfiguring, by the network-side device for the UE, a correspondence between the group identifier and the time-frequency resource(s), and sending, by the network-side device, dedicated signaling to the UE that requests the first system information, where the dedicated signaling includes the group identifier, so as to indicate the UE to acquire, according to the correspondence, the time-frequency resource(s) corresponding to the group identifier and then receive the first system information. The sending, by the network-side device, a group identifier and time-frequency resource(s) for the first system information to the UE includes: sending, by the network-side device, dedicated signaling to the UE that requests the first system information, where the dedicated signaling includes the group identifier and the time-frequency resource(s) for the first system information, so as to indicate the UE to receive the first system information by using the group identifier and the time-frequency resource(s); or sending, by the network-side device, dedicated signaling to the UE that requests the first system information, where the dedicated signaling includes the group identifier, and sending a second broadcast message to the UE, where the second broadcast message includes the time-frequency resource(s) for the first system information, so as to indicate the UE to receive the first system information by using the group identifier and the time-frequency resource(s). In other words, the base station may send the group ID to the UE by using the dedicated signaling, and send the time-frequency resource(s) to the UE by using the dedicated signaling or with a broadcast manner, or the UE may acquire the time-frequency resource(s) according to the correspondence between the group ID and the time-frequency resource(s).

In a possible design, each system information sent on demand corresponds to one group identifier, or at least two pieces of system information sent on demand correspond to a same common group identifier. The first system information includes the index for the first system information, or includes the index and the value tag for the first system information, or includes the index and the value tag for the first system information, and the common value tag of the at least two pieces of system information. The first system information may further include a validity time applied for the first system information. The validity time is used to indicate the UE to re-acquire the content of the first system information from the network-side device when a validity time for acquiring the first system information expires.

In a possible design, the method further includes: sending, by the network-side device, a paging message to the UE based on a paging period, where the paging message is used to indicate the UE to acquire last updated first system information based on the paging message; the paging message includes at least one of: content of the first system information that is lastly updated by the network-side device, a value tag for the first system information, or time-frequency resource(s) for the first system information; and the paging message further includes the common value tag if the first system information corresponds to the common value tag. A correspondence between the group ID and the paging period may be configured on the UE. The UE wakes up when the paging period arrives and receives the paging message sent by the base station, so as to update the first system information or the time-frequency resource(s) for the first system information based on the paging message.

A second aspect provides a method for sending system information, including: sending, by user equipment UE, a system information request to a network-side device, where the system information request is used to request to acquire first system information from the network-side device; receiving, by the UE, a group identifier sent by the network-side device, or receiving, by the UE, a group identifier and time-frequency resource(s) for the first system information that are sent by the network-side device; and receiving, by the UE based on the group identifier and the acquired time-frequency resource(s) for the first system information, the first system information sent by the network-side device.

In a possible design, before the sending, by UE, a system information request, the method further includes: receiving, by the UE, a first broadcast message sent by the network-side device, where the first broadcast message includes indication information for on-demand system information, and the indication information includes indication information for the first system information.

In a possible design, the indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes.

In a possible design, the indication information includes a bitmap, and a value of each bit in the bitmap is used to indicate whether system information corresponding to each bit needs to be acquired by the UE by sending a system information request.

In a possible design, the system information request includes an index for the first system information, or the system information request includes an index and a value tag for the first system information.

In a possible design, the receiving, by the UE, a group identifier sent by the network-side device includes: receiving, by the UE, dedicated signaling sent by the network-side device, where the dedicated signaling includes the group identifier. The receiving, by the UE based on the group identifier and the acquired time-frequency resource(s) for the first system information, the first system information sent by the network-side device includes: acquiring, by the UE, the time-frequency resource(s) for the first system information according to a correspondence between a group identifier and a preconfigured time-frequency resource(s); and receiving, by the UE, based on the time-frequency resource(s) for the first system information, the first system information sent by the network-side device.

In a possible design, the receiving, by the UE, a group identifier and time-frequency resource(s) for the first system information that are sent by the network-side device includes: receiving, by the UE, dedicated signaling sent by the network-side device, where the dedicated signaling includes the group identifier and the time frequency resource for the first system information; or receiving, by the UE, dedicated signaling sent by the network-side device, where the dedicated signaling includes the group identifier, and receiving a second broadcast message sent by the network-side device, where the second broadcast message includes the time frequency resource for the first system information.

In a possible design, when the system request message includes the index and the value tag for the first system information, the method further includes: receiving, by the UE, an acknowledgment message sent by the network-side device, so as to indicate the UE to continue to use the first system information saved by the UE.

In a possible design, each system information sent on demand corresponds to one group identifier, or at least two pieces of system information sent on demand correspond to a same common group identifier. The first system information includes the index for the first system information, or includes the index and the value tag for the first system information, or includes the index and the value tag for the first system information, and the common value tag of the at least two pieces of system information. The first system information may further include a validity time applied for the first system information. The validity time is used to indicate the UE to re-acquire the content of the first system information from the network-side device when a validity time for acquiring the first system information expires.

In a possible design, the method further includes: receiving, by the UE, a paging message sent by the network-side device when a paging period arrives, where the paging message includes at least one of content of first system information that is last updated by the network-side device, a value tag for the first system information, or time-frequency resource(s) for the first system information; and acquiring, by the UE, the last updated first system information based on the paging message.

A third aspect provides a method for sending system information, including: receiving, by a network-side device, a system information request sent by user equipment UE, where the system information request is used to request to acquire first system information from the network-side device; and broadcasting, by the network-side device, the first system information. In this way, when a plurality of UEs request on-demand SI from a base station at the same time, the base station does not send the SI to the UE by using dedicated signaling, but sends the SI to the UE with a broadcast manner. This saves network resources.

In a possible design, the method further includes: sending, by the network-side device, a broadcast message, where the broadcast message includes indication information for on-demand system information, and the indication information includes indication information for the first system information. The base station may periodically send the broadcast message, so that UE that newly enters a cell covered by the base station receives indication information of the on-demand SI in time.

In a possible design, the indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. For example, the UE compares a VT in the system information received from the base station with a VT of system information currently saved by the UE to determine whether to update the content of the system information.

In a possible design, the indication information includes a bitmap, and a value of each bit in the bitmap is used to indicate whether system information corresponding to each bit needs to be acquired by the UE by sending a system information request. For example, a value corresponding to each bit in the bitmap is 0011, 0 indicates that the UE does not need to actively request to acquire the corresponding system information from the base station, and 1 indicates that the UE needs to request to acquire the corresponding system information from the base station.

In a possible design, the broadcast message further includes time-frequency resource(s) or sending occasion(s) for the system information, where the time-frequency resource(s) or the sending occasion(s) is used by the UE to acquire the system information on the time-frequency resource or on the sending occasion(s). Alternatively, the broadcast message further includes monitoring duration for the system information, where the monitoring duration is used to indicate the UE to save the system information if the UE receives the system information within the monitoring duration, and if the UE does not receive the system information within the monitoring duration, to indicate the UE to request the network-side device to broadcast the system information. The monitoring duration may be implemented by a timer. The monitoring duration is set because another UE may request the system information from the base station. If UE that starts a timer receives system information within monitoring duration, the UE does not need to send a system information request to the base station.

In a possible design, the system information request includes an index for the first system information, or the system information request includes an index and a value tag for the first system information. When the system information request includes the index and the value tag for the first system information, before the sending, by the network-side device, a broadcast message, the method further includes: determining, by the network-side device, whether the value tag for the first system information sent by the UE is the same as a value tag of first system information saved by the network-side device; and if it is determined that the value tags are different, determining, by the network-side device, that content of the first system information has been updated. In this way, when the VTs are the same, the base station does not need to broadcast the system information to the UE. This further saves network resources.

In a possible design, the method further includes: if it is determined that the value tags are the same, sending, by the network-side device, an acknowledgment message to the UE, so as to indicate the UE to continue to use the first system information saved by the UE.

In a possible design, the first system information includes the index for the first system information, or includes the index and the value tag for the first system information, or includes the index and the value tag for the first system information, and a common value tag of at least two pieces of system information. In this way, the UE may determine whether the VT in the received first system information is the same as a VT of the first system information currently saved by the UE, to determine whether to update the first system information currently saved by the UE.

In a possible design, before the sending, by the network-side device, a broadcast message, the method further includes: scrambling, by the network-side device, the first system information by using a radio network temporary identifier RNTI. The first system information is on-demand SI, and a corresponding scrambling information RNTI may be different from scrambling information corresponding to important SI.

A fourth aspect provides a method for sending system information, including: sending, by user equipment UE, a system information request to a network-side device, where the system information request is used to request to acquire first system information from the network-side device; and receiving, by the UE, a first broadcast message sent by the network-side device, where the first broadcast message includes the first system information.

In a possible design, the method further includes: receiving, by the UE, a second broadcast message sent by the network-side device, where the second broadcast message includes indication information for on-demand system information, and the indication information includes indication information for the first system information.

In a possible design, the indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes.

In a possible design, the indication information includes a bitmap, and a value of each bit in the bitmap is used to indicate whether system information corresponding to each bit needs to be acquired by the UE by sending a system information request.

In a possible design, the second broadcast message further includes time-frequency resource(s) or sending occasion(s) for the system information. The receiving, by the UE, a first broadcast message sent by the network-side device includes: receiving, by the UE based on the time-frequency resource or the sending occasion(s), the first broadcast message sent by the network-side device.

In a possible design, the second broadcast message further includes monitoring duration for the system information. Before the sending, by UE, a system information request to a network-side device, the method further includes: starting, by the UE, a timer when the UE determines that the UE needs to acquire the first system information, where a timer length is the monitoring duration for the first system information; and determining, by the UE, whether the UE receives the first system information within the monitoring duration, and if it is determined that the UE does not receive the first system information within the monitoring duration, the UE determines that the UE needs to send the system information request to the network-side device.

In a possible design, the method further includes: if it is determined that the UE receives the first system information within the monitoring duration, saving, by the UE, the first system information and stops timing of the timer.

In a possible design, the first broadcast message further includes an index and a value tag for the first system information. The method further includes: after receiving the first broadcast message, receiving, by the UE, a third broadcast message sent by the network-side device, where the third broadcast message includes an index and a value tag for the first system information that are last updated; and determining, by the UE, whether the value tag of the saved first system information in the first broadcast message is the same as the last updated value tag for the first system information in the third broadcast message; and if it is determined that the value tags are different, updating, by the UE, content of the first system information based on the third broadcast message, and saving the value tag for the first system information in the third broadcast message.

A fifth aspect provides a network-side device, including: a receiving unit, configured to receive a system information request sent by user equipment UE, where the system information request is used to request to acquire first system information from the network-side device; and a sending unit, configured to send a group identifier to the UE, or the network-side device sends a group identifier and time-frequency resource(s) for the first system information to the UE. The sending unit is further configured to send the first system information to the UE.

In a possible design, the sending unit is further configured to send a first broadcast message, where the first broadcast message includes indication information for on-demand system information, and the indication information includes indication information for the first system information.

In a possible design, the indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes.

In a possible design, the indication information includes a bitmap, and a value of each bit in the bitmap is used to indicate whether system information corresponding to each bit needs to be acquired by the UE by sending a system information request.

In a possible design, the system information request includes an index for the first system information, or the system information request includes an index and a value tag for the first system information.

In a possible design, when the system information request includes the index and the value tag for the first system information, the network-side device further includes a determining unit, configured to determine whether the value tag for the first system information sent by the UE is the same as a value tag of first system information saved by the network-side device; and if it is determined that the value tags are different, the determining unit determines that content of the first system information has been updated.

In a possible design, the sending unit is further configured to: if it is determined that the value tags are the same, send an acknowledgment ACK message to the UE, so as to indicate the UE to continue to use the first system information saved by the UE.

In a possible design, the sending unit is configured to preconfigure, for the UE, a correspondence between the group identifier and the time-frequency resource(s). The network-side device sends dedicated signaling to the UE that requests the first system information, where the dedicated signaling includes the group identifier, so as to indicate the UE to acquire, according to the correspondence, the time-frequency resource(s) corresponding to the group identifier and receive the first system information. Alternatively, the sending unit is configured to send dedicated signaling to the UE that requests the first system information, where the dedicated signaling includes the group identifier and the time-frequency resource(s) for the first system information, so as to indicate the UE to receive the first system information by using the group identifier and the time-frequency resource(s). Alternatively, the sending unit is configured to send dedicated signaling to the UE that requests the first system information, where the dedicated signaling includes the group identifier, and send a second broadcast message to the UE, where the second broadcast message includes the time-frequency resource(s) for the first system information, so as to indicate the UE to receive the first system information by using the group identifier and the time-frequency resource(s).

In a possible design, each system information sent on demand corresponds to one group identifier, or at least two pieces of system information sent on demand correspond to a same common group identifier. The first system information includes the index for the first system information, or includes the index and the value tag for the first system information, or includes the index and the value tag for the first system information, and the common value tag of the at least two pieces of system information. The first system information may further include a validity time applied for the first system information. The validity time is used to indicate the UE to re-acquire the content of the first system information from the network-side device when a validity time for acquiring the first system information expires.

In a possible design, the sending unit is further configured to send a paging message to the UE based on a paging period, where the paging message is used to indicate the UE to acquire last updated first system information based on the paging message; the paging message includes at least one of content of the first system information that is last updated by the network-side device, a value tag for the first system information, or time-frequency resource(s) for the first system information; and the paging message further includes the common value tag if the first system information corresponds to the common value tag.

A sixth aspect provides user equipment UE, including: a sending unit, configured to send a system information request to a network-side device, where the system information request is used to request to acquire first system information from the network-side device; and a receiving unit, configured to receive a group identifier sent by the network-side device, or the UE receives a group identifier and time-frequency resource(s) for the first system information that are sent by the network-side device. The receiving unit is further configured to receive, based on the group identifier and the acquired time-frequency resource(s) for the first system information, the first system information sent by the network-side device.

In a possible design, the receiving unit is further configured to receive a first broadcast message sent by the network-side device, where the first broadcast message includes indication information for on-demand system information, and the indication information includes indication information for the first system information.

In a possible design, the indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes.

In a possible design, the indication information includes a bitmap, and a value of each bit in the bitmap is used to indicate whether system information corresponding to each bit needs to be acquired by the UE by sending a system information request.

In a possible design, the system information request includes an index for the first system information, or the system information request includes an index and a value tag for the first system information.

In a possible design, the receiving unit is configured to receive dedicated signaling sent by the network-side device, where the dedicated signaling includes the group identifier. Alternatively, the UE further includes an acquiring unit, configured to acquire the time-frequency resource(s) for the first system information according to a correspondence between a group identifier and a preconfigured time-frequency resource(s). The receiving unit is configured to acquire the time-frequency resource(s) for the first system information according to the correspondence between the group identifier and the preconfigured time-frequency resource(s).

In a possible design, the receiving unit is configured to receive dedicated signaling sent by the network-side device, where the dedicated signaling includes the group identifier and the time frequency resource for the first system information. Alternatively, the receiving unit is configured to receive dedicated signaling sent by the network-side device, where the dedicated signaling includes the group identifier, and receive a second broadcast message sent by the network-side device, where the second broadcast message includes the time frequency resource for the first system information.

In a possible design, when the system request message includes the index and the value tag for the first system information, the receiving unit is further configured to receive an acknowledgment message sent by the network-side device, so as to indicate the UE to continue to use first system information saved by the UE.

In a possible design, each system information sent on demand corresponds to one group identifier, or at least two pieces of system information sent on demand correspond to a same common group identifier. The first system information includes the index for the first system information, or includes the index and the value tag for the first system information, or includes the index and the value tag for the first system information, and the common value tag of the at least two pieces of system information. The first system information may further include a validity time applied for the first system information. The validity time is used to indicate the UE to re-acquire the content of the first system information from the network-side device when a validity time for acquiring the first system information expires.

In a possible design, the receiving unit is further configured to receive a paging message sent by the network-side device when a paging period arrives, where the paging message includes at least one of content of first system information that is last updated by the network-side device, a value tag for the first system information, or time-frequency resource(s) for the first system information. The UE further includes an acquiring unit, configured to acquire the last updated first system information based on the paging message.

A seventh aspect provides a network-side device, including: a receiving unit, configured to receive a system information request sent by user equipment UE, where the system information request is used to request to acquire first system information from the network-side device; and a broadcast unit, configured to broadcast the first system information.

In a possible design, the broadcast unit is further configured to send a broadcast message, where the broadcast message includes indication information for on-demand system information, and the indication information includes indication information for the first system information.

In a possible design, the indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes.

In a possible design, the indication information includes a bitmap, and a value of each bit in the bitmap is used to indicate whether system information corresponding to each bit needs to be acquired by the UE by sending a system information request.

In a possible design, the broadcast message further includes time-frequency resource(s) or sending occasion(s) for the system information, where the time-frequency resource(s) or the sending occasion(s) is used by the UE to acquire the system information on the time-frequency resource(s) or on the sending occasion(s). Alternatively, the broadcast message further includes monitoring duration for the system information, where the monitoring duration is used to indicate the UE to save the system information if the UE receives the system information within the monitoring duration, and if the UE does not receive the system information within the monitoring duration, to indicate the UE to request the network-side device to broadcast the system information.

In a possible design, the system information request includes an index for the first system information, or the system information request includes an index and a value tag for the first system information. When the system information request includes the index and the value tag for the first system information, the network-side device further includes a determining unit, configured to determine whether the value tag for the first system information sent by the UE is the same as a value tag of first system information saved by the network-side device; and if it is determined that the value tags are different, determine that content for the first system information has been updated.

In a possible design, the sending unit is configured to: if it is determined that the value tags are the same, send an acknowledgment message to the UE, so as to indicate the UE to continue to use the first system information saved by the UE.

In a possible design, the first system information includes the index for the first system information, or includes the index and the value tag for the first system information, or includes the index and the value tag for the first system information, and a common value tag of at least two pieces of system information.

In a possible design, the network-side device further includes a scrambling unit, configured to scramble the first system information by using a radio network temporary identifier RNTI.

An eighth aspect provides user equipment UE, including: a sending unit, configured to send a system information request to a network-side device, where the system information request is used to request to acquire first system information from the network-side device; and a receiving unit, configured to receive a first broadcast message sent by the network-side device, where the first broadcast message includes the first system information.

In a possible design, the receiving unit is further configured to receive a second broadcast message sent by the network-side device, where the second broadcast message includes indication information for on-demand system information, and the indication information includes indication information for the first system information.

In a possible design, the indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes.

In a possible design, the indication information includes a bitmap, and a value of each bit in the bitmap is used to indicate whether system information corresponding to each bit needs to be acquired by the UE by sending a system information request.

In a possible design, the second broadcast message further includes time-frequency resource(s) or sending occasion(s) for the system information. The receiving unit is configured to receive, based on the time-frequency resource(s) or the sending occasion(s), the first broadcast message sent by the network-side device.

In a possible design, the second broadcast message further includes monitoring duration for the system information. Before sending the system information request to the network-side device, the UE further includes a timing unit, configured to start a timer when the UE determines that the UE needs to acquire the first system information, where a timer length is the monitoring duration for the first system information; and a determining unit, configured to determine whether the UE receives the first system information within the monitoring duration, and if it is determined that the UE does not receive the first system information within the monitoring duration, determine that the UE needs to send the system information request to the network-side device.

In a possible design, the timing unit is further configured to: if it is determined that the UE receives the first system information within the monitoring duration, save the first system information and stop timing of the timer.

In a possible design, the first broadcast message further includes an index and a value tag for the first system information. The receiving unit is further configured to: after receiving the first broadcast message, receive a third broadcast message sent by the network-side device, where the third broadcast message includes an index and a value tag for the first system information that are last updated. The UE further includes a determining unit, configured to determine whether the value tag of the saved first system information in the first broadcast message is the same as the last updated value tag for the first system information in the third broadcast message; and if it is determined that the value tags are different, update content for the first system information based on the third broadcast message, and save the value tag for the first system information in the third broadcast message.

A ninth aspect provides a network-side device, including: a receiver, configured to receive a system information request sent by user equipment UE, where the system information request is used to request to acquire first system information from the network-side device; and a transmitter, configured to receive the system information request sent by the user equipment UE, where the system information request is used to request the first system information from the network-side device. The transmitter is further configured to send the first system information to the UE.

In a possible design, the transmitter is further configured to send a first broadcast message, where the first broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate whether system information corresponding to each bit needs to be acquired by the UE by sending a system information request.

In a possible design, the transmitter is configured to preconfigure, for the UE, a correspondence between the group identifier and the time-frequency resource(s). The network-side device sends dedicated signaling to the UE that requests the first system information, where the dedicated signaling includes the group identifier, so as to indicate the UE to acquire, according to the correspondence, the time-frequency resource(s) corresponding to the group identifier and receive the first system information. Alternatively, the transmitter is configured to send dedicated signaling to the UE that requests the first system information, where the dedicated signaling includes the group identifier and the time-frequency resource(s) for the first system information, so as to indicate the UE to receive the first system information by using the group identifier and the time-frequency resource(s). Alternatively, the transmitter is configured to send dedicated signaling to the UE that requests the first system information, where the dedicated signaling includes the group identifier, and send a second broadcast message to the UE, where the second broadcast message includes the time-frequency resource(s) for the first system information, so as to indicate the UE to receive the first system information by using the group identifier and the time-frequency resource(s).

In a possible design, each system information sent on demand corresponds to one group identifier, or at least two pieces of system information sent on demand correspond to a same common group identifier. The first system information includes the index for the first system information, or includes the index and the value tag for the first system information, or includes the index and the value tag for the first system information, and the common value tag of the at least two pieces of system information. The first system information may further include a validity time applied for the first system information. The validity time is used to indicate the UE to re-acquire the content of the first system information from the network-side device when a validity time for acquiring the first system information expires.

A tenth aspect provides user equipment UE, including: a transmitter, configured to send a system information request to a network-side device, where the system information request is used to request to acquire first system information from the network-side device; and a receiver, configured to receive a group identifier sent by the network-side device, or the UE receives a group identifier and time-frequency resource(s) for the first system information that are sent by the network-side device. The receiver is further configured to receive, based on the group identifier and the acquired time-frequency resource(s) for the first system information, the first system information sent by the network-side device.

In a possible design, the receiver is further configured to receive a first broadcast message sent by the network-side device, where the first broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate whether system information corresponding to each bit needs to be acquired by the UE by sending a system information request.

In a possible design, the receiver is configured to receive dedicated signaling sent by the network-side device, where the dedicated signaling includes the group identifier. Alternatively, the UE further includes a processor, configured to acquire the time-frequency resource(s) for the first system information according to a correspondence between a group identifier and a preconfigured time-frequency resource(s). The receiver is configured to receive the first system information according to the time-frequency resource(s) for the first system information.

In a possible design, the receiver is configured to receive dedicated signaling sent by the network-side device, where the dedicated signaling includes the group identifier and the time frequency resource for the first system information. Alternatively, the receiver is configured to receive dedicated signaling sent by the network-side device, where the dedicated signaling includes the group identifier, and receive a second broadcast message sent by the network-side device, where the second broadcast message includes the time frequency resource for the first system information.

In a possible design, each system information sent on demand corresponds to one group identifier, or at least two pieces of system information sent on demand correspond to a same common group identifier. The first system information includes the index for the first system information, or includes the index and the value tag for the first system information, or includes the index and the value tag for the first system information, and the common value tag of the at least two pieces of system information. The first system information may further include a validity time applied for the first system information. The validity time is used to indicate the UE to re-acquire the content of the first system information from the network-side device when a validity time for acquiring the first system information expires.

An eleventh aspect provides a network-side device, including: a receiver, configured to receive a system information request sent by user equipment UE, where the system information request is used to request to acquire first system information from the network-side device; and a transmitter, configured to broadcast the first system information.

In a possible design, the transmitter is further configured to send a broadcast message, where the broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content for the system information changes. Alternatively, the indication information includes a bitmap, and a value of each bit in the bitmap is used to indicate whether system information corresponding to each bit needs to be acquired by the UE by sending a system information request.

In a possible design, the broadcast message further includes time-frequency resource(s) or sending occasion(s) for the system information, where the time-frequency resource(s) or the sending occasion(s) is used by the UE to acquire the system information on the time-frequency resource(s) or on the sending occasion(s). Alternatively, the broadcast message further includes monitoring duration for the system information, where the monitoring duration is used to indicate the UE to save the system information if the UE receives the system information within the monitoring duration, and if the UE does not receive the system information within the monitoring duration, to indicate the UE to request the network-side device to broadcast the system information.

A twelfth aspect provides user equipment UE, including: a transmitter, configured to send a system information request to a network-side device, where the system information request is used to request to acquire first system information from the network-side device; and a receiver, configured to receive a first broadcast message sent by the network-side device, where the first broadcast message includes the first system information.

In a possible design, the receiver is further configured to receive a second broadcast message sent by the network-side device, where the second broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate whether system information corresponding to each bit needs to be acquired by the UE by sending a system information request.

In a possible design, the second broadcast message further includes time-frequency resource(s) or sending occasion(s) for the system information. The receiver is configured to receive, based on the time-frequency resource(s) or the sending occasion(s), the first broadcast message sent by the network-side device.

In a possible design, the second broadcast message further includes monitoring duration for the system information. The UE further includes a processor, configured to start a timer when the UE determines that the UE needs to acquire the first system information, where a timer length is the monitoring duration for the first system information, determine whether the UE receives the first system information within the monitoring duration, and if it is determined that the UE does not receive the first system information within the monitoring duration, determine that the UE needs to send the system information request to the network-side device.

A thirteenth aspect provides a communications system, including the network-side device provided in the ninth aspect and the UE provided in the tenth aspect.

A fourteenth aspect provides a communications system, including the network-side device provided in the eleventh aspect and the UE provided in the twelfth aspect.

A fifteenth aspect provides a communications system, including the network-side device provided in the ninth aspect.

A sixteenth aspect provides a communications system, including the network-side device provided in the eleventh aspect.

A seventeenth aspect provides a system chip, including an input/output interface, at least one processor, a memory, and a bus. The input/output interface is configured to receive a system information request sent by user equipment UE, where the system information request is used to request to acquire first system information from a network-side device. The input/output interface is further configured to send a group identifier to the UE, or the network-side device sends a group identifier and time-frequency resource(s) for the first system information to the UE. The input/output interface is further configured to send the first system information to the UE.

An eighteenth aspect provides a system chip, including an input/output interface, at least one processor, a memory, and a bus. The input/output interface is configured to send a system information request to a network-side device, where the system information request is used to request to acquire first system information from the network-side device. The input/output interface is further configured to receive a group identifier sent by the network-side device, or UE receives a group identifier and time-frequency resource(s) for the first system information that are sent by the network-side device. The input/output interface is further configured to receive, based on the group identifier and the acquired time-frequency resource(s) for the first system information, the first system information sent by the network-side device.

A nineteenth aspect provides a system chip, including an input/output interface, at least one processor, a memory, and a bus. The input/output interface is configured to receive a system information request sent by user equipment UE, where the system information request is used to request to acquire first system information from a network-side device. The input/output interface is further configured to broadcast the first system information.

A twentieth aspect provides a system chip, including an input/output interface, at least one processor, a memory, and a bus. The input/output interface is configured to send a system information request to a network-side device, where the system information request is used to request to acquire first system information from the network-side device. The input/output interface is further configured to receive a first broadcast message sent by the network-side device, where the first broadcast message includes the first system information.

According to a twenty-first aspect, an embodiment of the present invention provides a computer storage medium, configured to store computer software instructions used by the foregoing network-side device. The computer software instructions includes a program designed for executing the foregoing first aspect.

According to a twenty-second aspect, an embodiment of the present invention provides a computer storage medium, configured to store computer software instructions used by the foregoing UE. The computer software instructions includes a program designed for executing the foregoing third aspect.

According to a twenty-third aspect, an embodiment of the present invention provides a computer storage medium, configured to store computer software instructions used by the foregoing network-side device. The computer software instructions includes a program designed for executing the foregoing fifth aspect.

According to a twenty-fourth aspect, an embodiment of the present invention provides a computer storage medium, configured to store computer software instructions used by the foregoing UE. The computer software instructions includes a program designed for executing the foregoing seventh aspect.

According to a twenty-fifth aspect, an embodiment of the present invention provides a method for sending system information, including:

sending, by user equipment, a system information request to a network-side device, where the system information request is used to request to acquire first system information from the network-side device; and receiving, by the user equipment, the first system information broadcasted by the network-side device.

In a feasible design, the user equipment receives a broadcast message sent by the network-side device, where the broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the user equipment to determine whether content of the system information changes. Alternatively, the indication information includes a bitmap, and a value of each bit in the bitmap is used to indicate whether system information corresponding to each bit needs to be acquired by the user equipment by sending a system information request.

In a feasible design, the user equipment receives the broadcast message sent by the network-side device, where the broadcast message includes the indication information for on-demand system information, the indication information includes the indication information for the first system information, and the indication information is used to indicate whether the user equipment needs to send a system information request to acquire the system information.

In a feasible design, the indication information includes the bitmap, the bitmap includes at least one bit, and the value of each bit in the bitmap is used to indicate whether the system information corresponding to each bit needs to be acquired by the user equipment by sending a system information request.

In a feasible design, the broadcast message further includes time-frequency resource(s) or sending occasion(s) for the system information. The receiving, by the user equipment, the first system information broadcasted by the network-side device includes: receiving, by the user equipment based on the time-frequency resource(s) or the sending occasion(s), the first system information broadcasted by the network-side device.

In a feasible design, the broadcast message further includes monitoring duration for the system information, and the method further includes: sending, by the user equipment, the system information request to the network-side device if the user equipment does not receive the first system information within the monitoring duration.

In a feasible design, the system information request includes the bitmap, and one bit in the bitmap indicates that the first system information needs to be requested.

In a feasible design, after sending the system information request, the user equipment receives the first system information on a periodic time-frequency resource(s) for the first system information, on a nearest time-frequency resource of a sending time for the first system information, or on a nearest sending occasion of the sending time for the first system information.

In a feasible design, the first system information includes a validity time applied for the first system information.

In a feasible design, before the sending, by user equipment UE, a system information request to a network-side device, the method further includes: reading, by the UE, latest indication information, to determine whether the UE needs to send the system information request to acquire the first system information.

In a feasible design, before the sending, by user equipment, a system information request to a network-side device, the method further includes: the user equipment does not receive the first system information on a next received time-frequency resource for the first system information or on a next received sending occasion for the first system information. The user equipment first determines whether the user equipment receives the first system information on the next received time-frequency resource for the first system information or on the next received sending occasion for the first system information.

According to a twenty-sixth aspect, an embodiment of the present invention provides a method for sending system information, including: receiving, by a network-side device, a system information request sent by user equipment, where the system information request is used to request to acquire first system information from the network-side device; and broadcasting, by the network-side device, the first system information.

In a feasible design, the network-side device sends a broadcast message, where the broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate whether system information corresponding to each bit needs to be acquired by the UE by sending a system information request.

In a feasible design, the network-side device sends the broadcast message, where the broadcast message includes the indication information instructing to send the system information on demand, the indication information includes the indication information for the first system information, and the indication information is used to indicate whether the user equipment needs to send a system information request to acquire the system information.

In a feasible design, the indication information includes the bitmap, the bitmap includes at least one bit, and the value of each bit in the bitmap is used to indicate whether the system information corresponding to each bit needs to be acquired by the user equipment by sending a system information request.

In a possible design, the broadcast message includes time-frequency resource(s) or sending occasion(s) for the system information, where the time-frequency resource(s) or the sending occasion(s) is used by the user equipment to acquire the system information on the time-frequency resource(s) or on the sending occasion(s).

In a possible design, the broadcast message includes monitoring duration for the system information; and in one case: when the user equipment receives the system information within the monitoring duration, the user equipment saves the system information; or in another case: when the user equipment does not receive the system information within the monitoring duration, the user equipment requests the network-side device to broadcast the system information.

In a possible design, the network-side device selects a nearest time-frequency resource or a nearest sending occasion from a broadcast periodic time-frequency resource(s) or a broadcast sending occasion(s), to broadcast the first system information.

In a feasible design, the first system information includes a validity time applied for the first system information.

According to a twenty-seventh aspect, an embodiment of the present invention provides user equipment, including: a memory, a transceiver, and at least one processor. The memory stores an instruction. The memory, the transceiver, and the at least one processor are interconnected. The transceiver is configured to perform an operation of sending and receiving information by the user equipment in the method provided in the twenty-fifth aspect. The at least one processor invokes the instruction stored in the memory and executes a processing operation performed by the user equipment in the method provided in the twenty-fifth aspect.

According to a twenty-eighth aspect, an embodiment of the present invention provides a network-side device, including: a memory, a transceiver, and at least one processor. The memory stores an instruction. The memory, the transceiver, and the at least one processor are interconnected. The transceiver is configured to perform an operation of sending and receiving information by the network-side device in the method provided in the twenty-sixth aspect. The at least one processor invokes the instruction stored in the memory and executes a processing operation performed by the network-side device in the method provided in the twenty-sixth aspect.

According to a twenty-ninth aspect, an embodiment of the present invention provides a chip system, applied to user equipment, where the chip system includes at least one processor, a memory, and an interface circuit. The interface circuit is responsible for information exchange between the chip system and an external system. The memory, the interface circuit, and the at least one processor are interconnected. The at least one memory stores an instruction. The instruction is executed by the at least one processor to perform an operation of the user equipment in the method provided in the twenty-fifth aspect.

According to a thirtieth aspect, an embodiment of the present invention provides a chip system, applied to a network-side device, where the chip system includes at least one processor, a memory, and an interface circuit. The interface circuit is responsible for information exchange between the chip system and an external system. The memory, the interface circuit, and the at least one processor are interconnected. The at least one memory stores an instruction. The instruction is executed by the at least one processor to perform an operation of the network-side device in the method provided in the twenty-sixth aspect.

According to a thirty-first aspect, an embodiment of the present invention provides a computer-readable storage medium, applied to user equipment, where the computer-readable storage medium stores an instruction, and the instruction is run on a computing device to perform an operation of the user equipment in the method provided in the twenty-fifth aspect.

According to a thirty-second aspect, an embodiment of the present invention provides a computer-readable storage medium, applied to a network-side device, where the computer-readable storage medium stores an instruction, and the instruction is run on a computing device to perform an operation of the network-side device in the method provided in the twenty-sixth aspect.

According to a thirty-third aspect, an embodiment of the present invention provides a communications system, including: a network-side device and/or user equipment. The network-side device is the network-side device provided in the twenty-eighth aspect, and the user equipment is the user equipment provided in the twenty-seventh aspect.

According to a thirty-fourth aspect, an embodiment of the present invention provides a computer program product, applied to user equipment, where the computer program product includes a series of instructions, and the instructions are run to perform an operation of the user equipment in the method provided in the twenty-fifth aspect.

According to a thirty-fifth aspect, an embodiment of the present invention provides a computer program product, applied to a network-side device, where the computer program product includes a series of instructions, and the instructions are run to perform an operation of the network-side device in the method provided in the twenty-sixth aspect.

As described above, when receiving the system information request sent by the UE, the network-side device may send the group identifier, or the group identifier and the time-frequency resource(s) to the UE, so that the UE descrambles the time-frequency resource(s) based on the group identifier and receives the first system information sent by the network-side device. In a case in which a plurality of UEs request same system information, the network-side device does not need to send the dedicated signaling to each UE to transmit the system information, but sends the system information in a multicast manner. Compared with sending the system information by using the dedicated signaling, the multicast manner saves network time-frequency resource(s). Alternatively, when receiving the system information request sent by the UE, the network-side device may broadcast the first system information requested in the system information request. In a case in which the plurality of UEs request the same system information, the base station does not transmit the first system information to each UE by using the dedicated signaling, but broadcasts the first system information with a broadcast manner. This not only enables UE that currently needs the first system information to receive the first system information, but also enable other UEs that are interested in the first system information to receive the first system information in advance without requesting to acquire the first system information from the base station. Compared with transmitting the first system information by using the dedicated signaling, which occupies a relatively large number of network time-frequency resource(s), the broadcast manner saves the network time-frequency resource(s).

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments acquired by a person of ordinary skill in the art based on the embodiments of the present invention without creative efforts shall fall within the protection scope of the present invention.

The embodiments of the present invention may be applied to a scenario in which UE requests on-demand SI from a network (NW), in other words, the SI is sent by the NW to the UE when the UE requires the SI.

Figure 1:
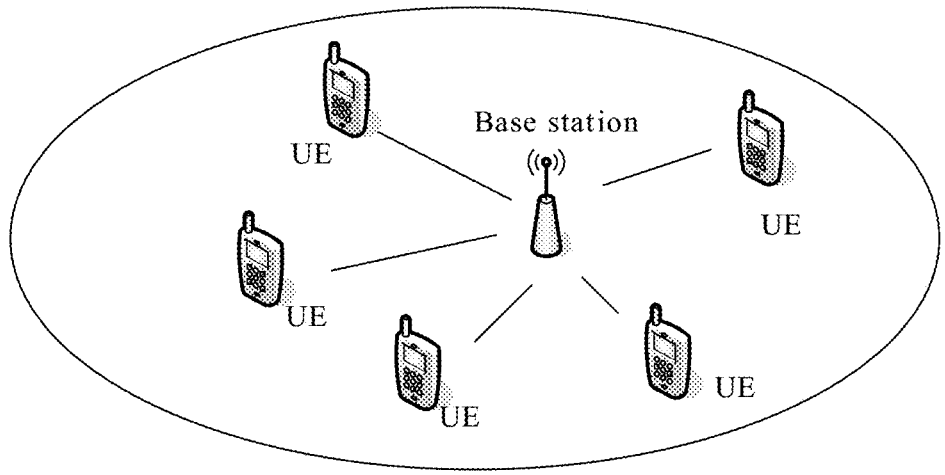
FIG. 1 is a schematic diagram of a communications system according to an embodiment of the present invention.

An embodiment of the present invention provides a communications system. As shown in FIG. 1, the communications system includes at least one UE and a network-side device. The network-side device may be a base station. The UE is within a cell coverage area of the base station. The UE is configured to send a system information request to the network-side device, and the network-side device is configured to send, with a multicast or broadcast manner, system information requested by the UE to the UE according to the system information request.

In the embodiments of the present invention, the UE may be any one of the following, and the UE may be static or mobile. The UE may include but is not limited to a station, a mobile station, a subscriber unit, a personal computer, a laptop computer, a tablet computer, a netbook, a terminal, a cellular phone, a handheld device, a cordless phone, a personal digital assistant (PDA), a data card, a Universal Serial Bus (USB) inserting device, a mobile WiFi hotspot device (MiFi Device), a smart watch, smart glasses, a wireless modem, a wireless router, a wireless local loop (WLL) station, or the like. The base station (NodeB) may be a base station in a Long Term Evolution (LTE) network, a base station in an evolved universal terrestrial radio access network (UTRAN), or a base station in a new radio network, or the like.

Figure 2:
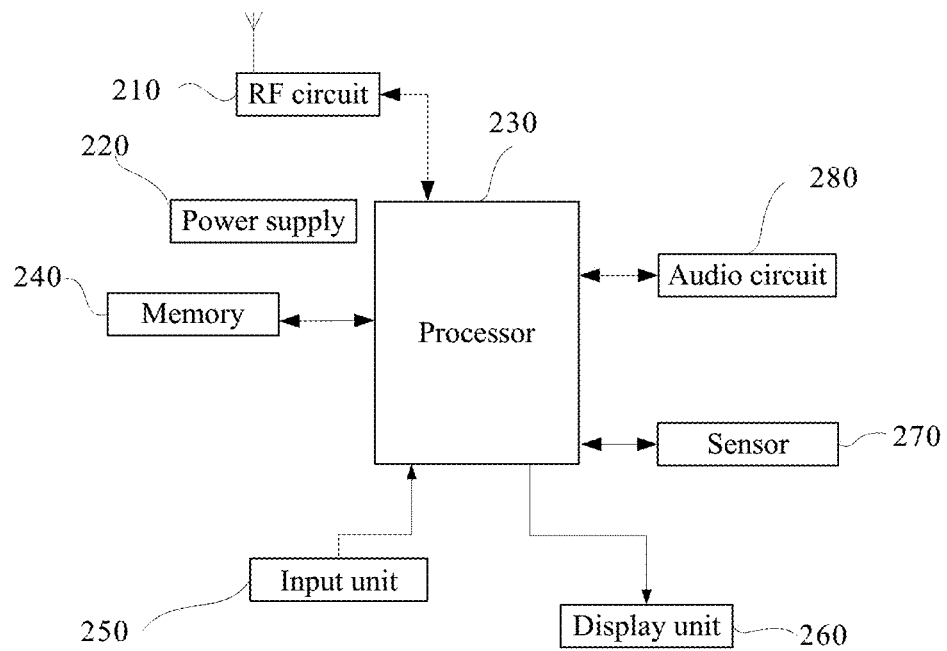
FIG. 2 is a schematic diagram of a structure of UE according to an embodiment of the present invention.

The UE being a mobile phone is used as an example. FIG. 2 shows a block diagram of a partial structure of a mobile phone related to this embodiment of the present invention. Referring to FIG. 2, the mobile phone includes: a radio frequency (RF) circuit 210, a power supply 220, a processor 230, a memory 240, an input unit 250, a display unit 260, a sensor 270, an audio circuit 280, and the like. A person skilled in the art may understand that the mobile phone structure shown in FIG. 2 does not constitute a limitation on the mobile phone. The mobile phone may include more or fewer components than those shown in the figure, or combine some components, or have different component arrangements.

A base station (BS) device, which may also be referred to as a base station, is an apparatus that is deployed in a radio access network to provide a wireless communication function. For example, in a 2G network, a device that provides a base station function includes a base transceiver station (BTS) and a base station controller (BSC); in a 3G network, a device that provides a base station function includes a NodeB and a radio network controller (RNC); in a 4G network, a device that provides a base station function includes an E-UTRAN NodeB (evolved NodeB, eNB); in a 5G network, devices that provide a base station function include a new radio NodeB (gNB), a centralized unit (CU), a distributed unit, and a new radio controller; and in a WLAN, a device that provides a base station function is an access point (AP).

The embodiments of the present invention provide a method, UE, and a network-side device for sending system information. The network-side device may be the foregoing base station or any other network-side device. When the UE needs to acquire system information and sends a system information request to the base station, the base station may determine, according to the system information request used to request the system information, a current quantity of requests for requesting the system information. When there are a small quantity of requests, the base station may use dedicated signaling to send the system information to each UE. When there are a large quantity of requests, the base station may send, in a multicast manner, a group identifier (Group ID), time-frequency resource(s), and the system information to a plurality of UEs that request the same system information. When there are more requests, the base station may send the system information to the UEs with a broadcast manner. In this way, when the plurality of UEs request the same system information, the base station may send the system information to the plurality of UEs with a multicast or broadcast manner, and does not need to use the dedicated signaling to send the system information to each of the UEs that request the system information. This reduces network time-frequency resource(s) occupied by a plurality of pieces of dedicated signaling.

Figure 3:
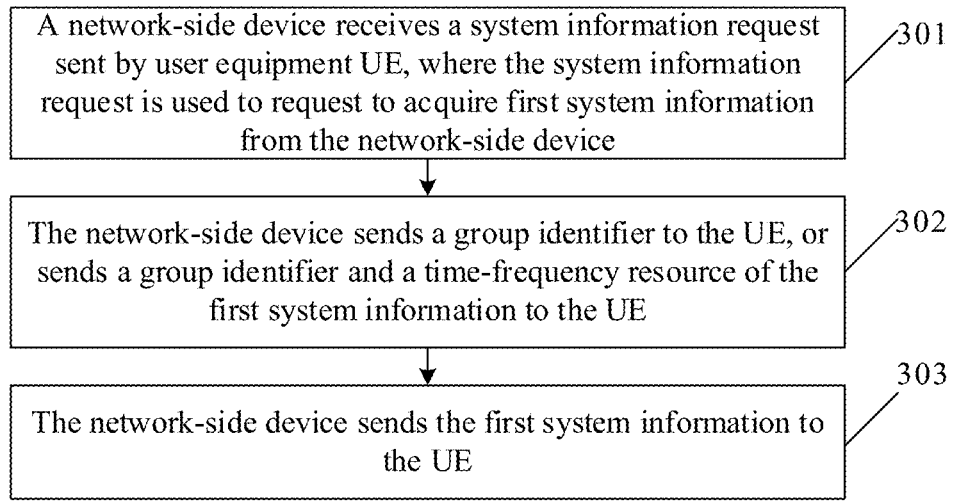
FIG. 3 is a schematic flowchart of a method for sending system information according to an embodiment of the present invention.

An embodiment of the present invention provides a method for sending system information. The following describes an example in which an NW side sends, in a multicast manner, system information to UE that sends a system information request. For a network-side device, as shown in FIG. 3, the method includes the following steps.

301: The network-side device receives the system information request sent by the user equipment UE, where the system information request is used to request to acquire first system information from the network-side device.

The network-side device may be the foregoing base station, and the first system information may be any on-demand SI.

302: The network-side device sends a group identifier to the UE, or sends a group identifier and time-frequency resource(s) for the first system information to the UE.

The UE descrambles the received time-frequency resource(s) for the system information based on the group ID when the network-side device sends the system information in a multicast manner.

It may be understood that the group identifier may be predefined in a protocol, or may be acquired according to a rule predefined in the protocol.

For example, when the base station determines, based on a quantity of requests for requesting the first system information, to send the first system information in a multicast manner, the base station may send the group ID to the UE that requests the first system information. In this case, a correspondence between a group ID and time-frequency resource(s) may be preconfigured for the UE. Alternatively, the base station may send the group ID and the time-frequency resource(s) for the first system information to the UE that requests the first system information.

303: The network-side device sends the first system information to the UE.

The UE may descramble the time-frequency resource(s) based on the group ID, and receive, based on the time-frequency resource(s), the first system information sent by the base station. The base station does not need to use dedicated signaling to transmit the first system information to each UE that requests the first system information, but sends the first system information in a multicast manner. This saves network time-frequency resource(s) for sending the first system information.

Figure 4:
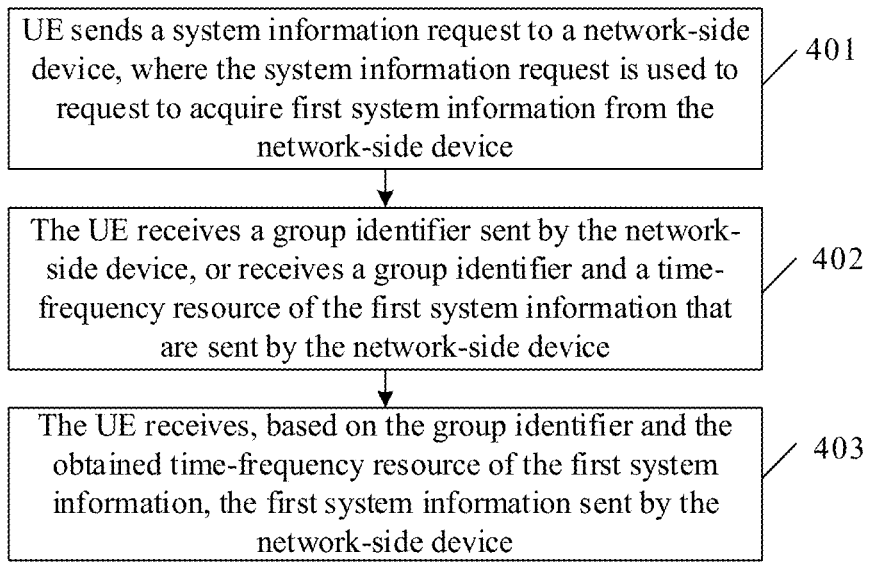
FIG. 4 is a schematic flowchart of a method for sending system information according to an embodiment of the present invention.

Alternatively, in step 302, the network-side device may send the group ID and receiving time indication information for the first system information to the UE. The receiving time indication information may be used to indicate the UE to receive the first system information in a time range, at a time point, or within a time window. Correspondingly, in step 303, the UE descrambles, based on the group ID, the time frequency resource, at a time, indicated by the receiving time indication information, and receives the first system information sent by the network-side device. The following describes an example in which the NW side sends, in a multicast manner, the system information to the UE that sends the system information request. For the UE, as shown in FIG. 4, the method includes the following steps.

401: The UE sends the system information request to the network-side device, where the system information request is used to request to acquire the first system information from the network-side device.

402: The UE receives the group identifier sent by the network-side device, or receives the group identifier and the time-frequency resource(s) for the first system information that are sent by the network-side device.

Alternatively, the UE may receive the group ID and the receiving time indication information for the first system information that are sent by the network-side device. The receiving time indication information may be used to indicate the UE to receive the first system information in a time range, at a time point, or within a time window.

Alternatively, the group identifier may be predefined in a protocol, or may be acquired by the UE according to a rule predefined in the protocol.

403: The UE receives, based on the group identifier and the acquired time-frequency resource(s) for the first system information, the first system information sent by the network-side device.

Alternatively, the UE may descramble, based on the group ID, the time-frequency resource(s), at the time, indicated by the receiving time indication information, and receive the first system information sent by the network-side device.

The following further describes the embodiments of the present invention.

Figure 5:
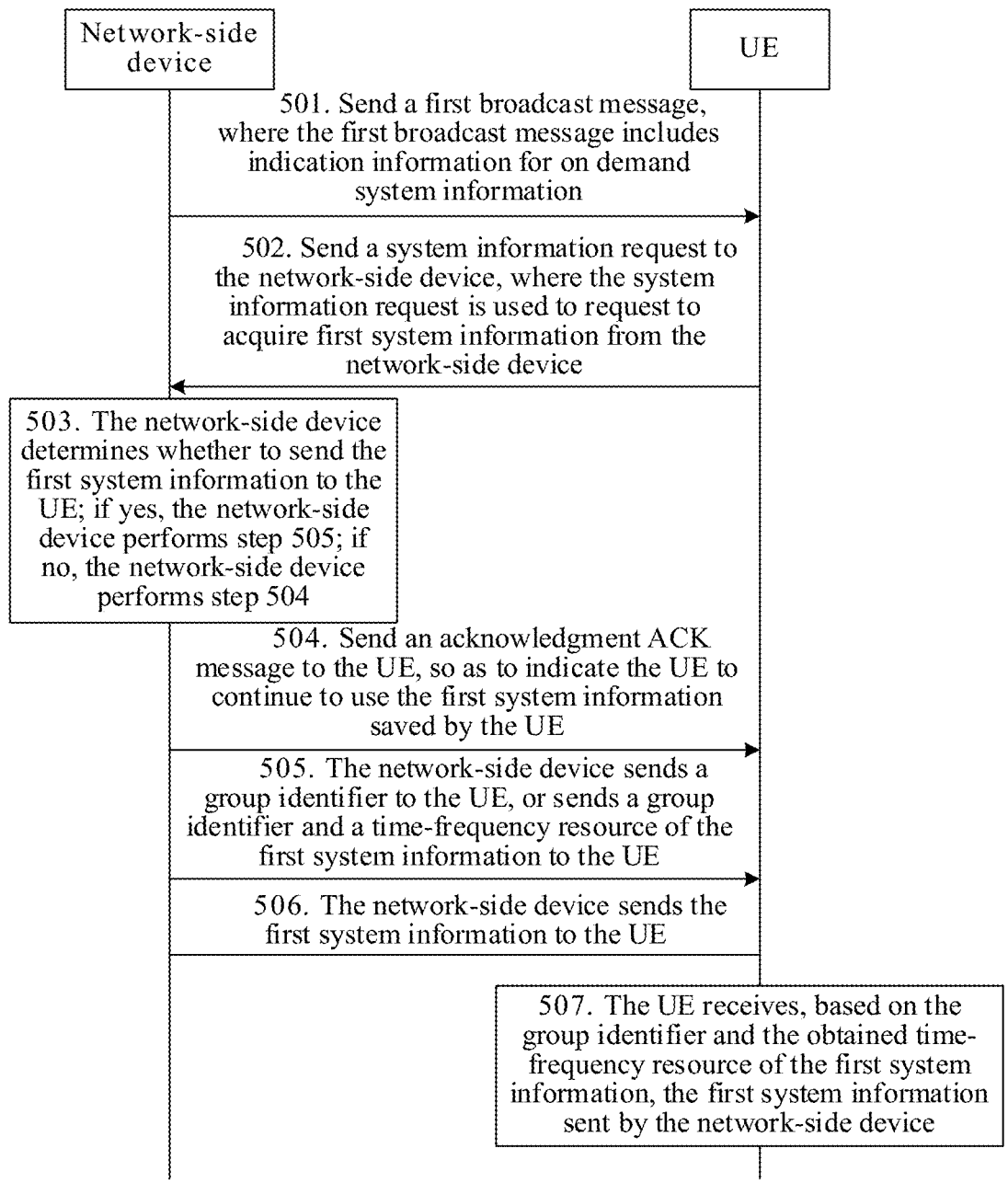
FIG. 5 is a schematic flowchart of a method for sending system information according to an embodiment of the present invention.

An embodiment of the present invention provides a method for sending system information. The following describes an example in which an NW side sends, in a multicast manner, system information to UE that sends a system information request. By using an example of a network-side device being a base station, as shown in FIG. 5, the method includes the following steps.

501: The network-side device sends a first broadcast message, where the first broadcast message includes indication information for on-demand system information.

The network-side device is a base station in the following description.

The base station may send important SI to the UE by broadcast. For on-demand SI, the base station may broadcast indication information for the on-demand SI to the UE, so as to indicate the UE to send a system information request to acquire the on-demand SI. Unless otherwise specified, the SI mentioned in the following embodiments refers to on-demand SI.

The indication information may be in a form of a list or a bitmap.

The first broadcast message may include a list (On-demand SI list) or a bitmap for indicating SI.

If the indication information includes a list, the list may include an index (number) for the system information, or include an index and a value tag (VT) for the system information, or include an index and a value tag for the system information, and a common value tag (common VT) of at least two pieces of system information. The value tag is used by the UE to determine whether content of the system information changes.

For example, when the list includes the index and the value tag of the SI, as shown in Table 1, the indication information may be as follows:

TABLE 1

| On-demand SI num | VT |
|---|---|
| SI 1 | 1 |
| SI 2 | 3 |

On-demand SI num in Table 1 represents an index of the SI, for example, the indexes are SI 1 and SI 2. VT represents a value tag corresponding to the SI, for example, 1 and 3. The list may not include a VT. When receiving the list, the UE may determine, based on the index, which SI needs to be acquired by sending a system information request, to be specific, a correspondence between the index of the SI and the SI is configured for the UE. The UE may learn of, according to the index of the SI in the received list and the correspondence, which SI needs to be acquired by sending the system information request. The correspondence may be preconfigured by the base station for the UE.

When the list includes the index, the value tag, and the common value tag of the SI, it is assumed that the indexes of the SI include SI 1, SI 2, SI 3, and SI 4, which are divided into two groups: an SI group 1 and an SI group 2. The SI group 1 includes the SI 1 and the SI 2, and the SI group 2 includes the SI 3 and the SI 4. A common VT of the SI group 1 is 0, and a common VT of the SI group 2 is 1. As shown in Table 2, the indication information may be as follows:

TABLE 2

| On-demand SI num | VT |
|---|---|
| SI group 1 | common VT 1 |
| SI 1 | |
| SI 2 | |
| SI group 2 | common VT 1 |
| SI 3 | |
| SI 4 | |
| SI group 1 | common VT 1 |
| SI 1 | 1 |
| SI 2 | 3 |
| SI group 2 | common VT 1 |
| SI 3 | 1 |
| SI 4 | 3 |

It can be learned from Table 2-2 that, when a VT of the SI 1 is 1, a VT of the SI 2 is 3, and the common VT of the corresponding SI group 1 is 1. If information content of either of the SI1 and the SI2 changes, the VT corresponding to the SI also changes, and the common VT of the SI group 1 corresponding to the SI 1 and the SI 2 also changes accordingly. For example, the VT corresponding to the SI increases by 1, a value of the common VT of the SI group 1 increases by 1. Similarly, if information content of either of the SI 3 and the SI 4 changes, the VT corresponding to the SI also changes, and the common VT of the SI group 2 corresponding to the SI 3 and the SI 4 also changes accordingly. It should be noted that, when the information content of the SI changes and the corresponding VT continuously increases, a value of the VT may be limited in a specific value range. For example, the value range of the VT is 1-16. When the content of the SI changes frequently, after the value corresponding to the VT changes to a maximum value 16, if content of the SI changes again, the value corresponding to the VT may be updated from 16 to a minimum value 1 of the VT.

When the first broadcast message includes a bitmap for indicating an on-demand SI, a value of each bit in the bitmap is for indicating that whether an SI corresponding to each bit needs to be acquired by the UE by sending a system information request. For example, the bitmap may be 0011, and the bits correspond to the SI 1, the SI 2, the SI 3, and the SI 4 in sequence. A bit value being 0 indicates that corresponding SI is not being broadcasted, and the UE needs to acquire the corresponding SI by sending a system information request. A bit value being 1 indicates that the corresponding SI is being broadcasted, and the UE may acquire time-frequency resource(s) of the SI according to scheduling information in the broadcast and receive the SI.

It should be noted that the first broadcast message may be periodically broadcasted, so that UE that newly enters a cell covered by the base station receives, in time, indication information of SI by sending a system information request.

502: The UE sends the system information request to the network-side device, where the system information request is used to request to acquire first system information from the network-side device.

After receiving the indication information, if the UE needs to acquire one SI indicated by the indication information, the UE sends the system information request to the base station. The system information request may include an index of the SI. The system information request may include a bitmap. The bitmap may be used to request to acquire the first system information from the network-side device. The bitmap includes at least one bit. Each bit may correspond to different system information, and may be used to indicate whether to request to acquire first system information corresponding to each bit. For example, when a value of one bit being 1, indicating that the UE requests to acquire system information corresponding to the bit. When the value of the bit being 0, indicating that the UE does not request to acquire the system information corresponding to the bit. It may be understood that when the value of the bit being 1, it indicates that the UE does not request to acquire the system information corresponding to the bit, and when the value of the bit being 0, it indicates that the UE requests to acquire the system information corresponding to the bit. If the UE has saved information content of the SI and sends the system information at this time to acquire updated information content of the SI from the base station, the system information request may include the index and a VT of the SI.

For example, if the system information that the UE requests to acquire includes the SI 1 and the SI 3, Table 3-1 shows information content of the system information request sent by the UE:

TABLE 3-1

| Request SI List |
|---|
| SI 1 |
| SI 3 |

For example, the system information that the UE requests to acquire the SI 1 and the SI 3. If the system information sent by the network-side device based on a demand may include the SI 1, the SI 2, the SI 3, and the SI 4, in an example corresponding manner in which a rightmost bit in the bitmap corresponds to the SI 1, a leftmost bit corresponds to the SI 4, Table 3-2 shows the information content of the system information request (Request) sent by the UE:

TABLE 3-2

| Request SI List |
| --- |
| 0101 |

It may be understood that, a manner for expressing how the bitmap corresponds to the system information may alternatively be that the rightmost bit in the bitmap corresponds to the SI 4, and the leftmost bit corresponds to the SI 1.

When the system information request includes the index and the VT of the SI, Table 4 shows the information content of the system information request sent by the UE:

TABLE 4

| Request SI List | VT |
| --- | --- |
| SI 1 | 3 |
| SI 3 | 4 |

When the system information request carries the index of the SI and does not carry the VT of the SI, step 505 may be directly performed after step 502. When the system information request carries the index and the VT of the SI, step 503 may be performed after step 502.

503: The network-side device determines whether to send the first system information to the UE; if the network-side device determines to send the first system information to the UE, the network-side device performs step 505; if the network-side device determines not to send the first system information to the UE, the network-side device performs step 504.

If the system information request includes an index and a VT for the first system information SI requested by the UE, the base station may first determine whether the VT for the first system information SI sent by the UE is the same as a VT of the SI saved by the base station. If the VTs are the same, it indicates that content of first system information currently saved by the UE is usable, step 504 may be directly performed. If the VTs are different, the base station determines that content of the first system information on the base station side has been updated, and the base station needs to send the content of the new first system information to the UE. For example, if the index of the SI in the system information request sent by the UE is the SI 3 and the VT is 3, when receiving the system information request, the base station acquires, based on the index SI 3 of the SI, the VT of the SI 3 currently saved by the base station. If the VT of the SI 3 saved by the base station is 3, the base station determines to send an acknowledgement (ACK) message to the UE, to indicate that the content of the SI 3 currently saved by the UE is valid. If the VT of the SI 3 saved by the base station is 4, it indicates that the content of the SI 3 on the base station side has been updated, the base station needs to send the updated SI 3 to the UE.

504. The network-side device sends an acknowledgment ACK message to the UE, so as to indicate the UE to continue to use the first system information saved by the UE.

It may be understood that when the system information request of the UE includes a plurality of indexes and VTs of SI, an ACK message sent by the network-side device needs to indicate an index of corresponding SI, so that the UE learns content of which SI does not need to be updated.

505: The network-side device sends a group identifier to the UE, or sends a group identifier and time-frequency resource(s) for the first system information to the UE.

Alternatively, the network-side device may send the group ID and receiving time indication information for the first system information to the UE. The receiving time indication information may be used to indicate the UE to receive the first system information in a time range, at a time point, or within a time window.

It may be understood that if the group identifier is predefined in a protocol, or may be acquired according to a rule predefined in the protocol, step 505 does not need to be performed. This embodiment uses an example in which the network-side device sends the group identifier to the UE, but sets no limit on other manners of acquiring the group identifier.

The UE descrambles the received time-frequency resource(s) for the system information based on the group ID when the network-side device sends the system information in a multicast manner.

In a first implementation, the base station may preconfigure a correspondence between at least one group ID and time-frequency resource(s) for the UE. When the UE requests the first system information, the base station may send dedicated signaling to the UE that requests the first system information. The dedicated signaling includes a group ID allocated to the UE that requests the first system information, so as to indicate the UE to acquire, according to a correspondence, time-frequency resource(s) corresponding to the group ID of the first system information, and further receive the first system information based on the time-frequency resource(s). To be specific, the base station may preconfigure some time-frequency resource(s) as time-frequency resource(s) of on-demand SI, and establish a correspondence between group IDs and the time-frequency resource(s). After receiving a group ID, the UE reads a preconfigured time-frequency resource(s) and attempts to demodulate the preconfigured time-frequency resource(s) to acquire the first system information. Alternatively, the base station may preconfigure the correspondence between the at least one group ID and the receiving time indication information for the UE. When the UE requests the first system information, the base station may send the dedicated signaling to the UE that requests the first system information. The dedicated signaling includes the group ID allocated to the UE that requests the first system information, so as to indicate the UE to acquire, according to the correspondence between the group ID and the receiving time indication information, a receiving time corresponding to the group ID of the first system information, and further receive the first system information based on the receiving time. In other words, the base station may preconfigure specific receiving time indication information as a receiving time of the on-demand SI, and establish a correspondence between a group ID and the receiving time. After receiving the group ID, the UE reads the preconfigured receiving time and attempts to demodulate the preconfigured receiving time to acquire the first system information.

In a second implementation, the base station may send dedicated signaling to the UE that requests the first system information. The dedicated signaling includes the group ID and the time-frequency resource(s) for the first system information, so as to indicate the UE to receive, by using the group ID and the time-frequency resource(s), the first system information to be sent by the base station.

In a third implementation, the base station may send dedicated signaling to the UE that requests the first system information. The dedicated signaling includes the group ID. The base station may send a second broadcast message to the UE that requests the first system information. The second broadcast message includes the time-frequency resource(s) for the first system information, so as to indicate the UE to receive the first system information by using the group ID and the time-frequency resource(s). For example, the base station may use a master information block (MIB) or a scheduling block (SB) to carry the time-frequency resource(s) for the first system information, in other words, the second broadcast message may be an MIB or an SB, or may be in another message format. This is not limited in this application.

In a fourth implementation, the base station may send dedicated signaling to the UE that requests the first system information. The dedicated signaling includes the group ID and the receiving time indication information for the first system information. The receiving time indication information may be used to indicate the UE to receive the first system information in a time range, at a time point, or within a time window, so that the UE receives, by using the group ID and the receiving time indication information, the first system information to be sent by the base station.

In a fifth implementation, the base station may send dedicated signaling to the UE that requests the first system information. The dedicated signaling includes the group ID. The base station may send a second broadcast message to the UE that requests the first system information. The second broadcast message includes the receiving time indication information for the first system information, so as to indicate the UE to receive the first system information by using the group ID and the receiving time indication information. For example, the base station may use a master information block MIB or a scheduling block SB to carry the receiving time indication information for the first system information, in other words, the second broadcast message may be an MIB or an SB, or may be in another message format. This application is not limited thereto.

Optionally, when the base station sends the group ID to the UE, or sends the group ID and the time-frequency resource(s) to the UE, the first system information may be carried in a message for sending the time-frequency resource(s). In other words, when the base station sends the group ID in the first implementation, the dedicated signaling may include the group ID and the first system information. When the base station sends the dedicated signaling in the second implementation, the dedicated signaling includes the group ID, the time-frequency resource(s), and the first system information. When the base station sends the second broadcast message in the third implementation, the second broadcast message includes the time-frequency resource(s) and the first system information.

506: The network-side device sends the first system information to the UE.

The base station sends the group ID, or the group ID and the time-frequency resource(s), or the group ID and the receiving time indication information to the UE that requests the first system information, or the UE may acquire the group ID as predefined in the protocol or according to the rule predefined in the protocol, and therefore the base station may send, in a multicast manner, the first system information to the UE that requests the first system information.

Each system information sent on demand may correspond to one group ID, or at least two pieces of system information sent on demand correspond to a same common group ID.

The first system information sent by the network-side device may include the index for the first system information, or include the index and the VT for the first system information, or include the index and the VT for the first system information, and a common VT of at least two pieces of system information.

Optionally, the first system information sent by the network-side device may further include a validity time applied for the first system information. The validity time is used to indicate the UE to re-acquire the content of the first system information from the network-side device when the validity time expires and the UE needs to acquire the first system information. The validity time may be further used to indicate a validity time of the time-frequency resource(s) for the first system information. For example, when the validity time expires and the UE needs to acquire the first system information, the UE may acquire an updated time-frequency resource(s) based on a preconfigured manner of acquiring the time-frequency resource(s). For example, the updated time-frequency resource(s) is time-frequency resource(s) in a $k^{th}$ subframe to a $(k+n)^{th}$ subframe after the system information request is sent. Alternatively, the UE may acquire a new time-frequency resource(s) from the base station before the validity time expires.

507: The UE receives, based on the group identifier and the acquired time-frequency resource(s) for the first system information, the first system information sent by the network-side device.

This embodiment uses an example in which the network-side device uses the dedicated signaling to carry the group ID to the UE, but sets no limit on other manners of acquiring the group identifier.

If the first implementation is applied in step 505, in other words, the dedicated signaling carries the group ID, the UE may acquire the time-frequency resource(s) according to the correspondence between the group ID and the time-frequency resource(s). For example, the time-frequency resource(s) corresponding to the group ID is located in a $k^{th}$ subframe (k is a positive integer) after the UE sends the system information request or after the UE receives the dedicated signaling, or the time-frequency resource(s) is located in a $k^{th}$ subframe window to a $(k+n)^{th}$ (n is a positive integer) subframe window after the UE sends the system information request or after the UE receives the dedicated signaling. When the UE determines to receive the time-frequency resource(s) for the first system information, the UE receives the first system information in a time domain and a frequency domain corresponding to the time-frequency resource(s).

If the second implementation is applied in step 505, in other words, the dedicated signaling carries the group ID and the time-frequency resource(s) for the first system information, the UE descrambles the time-frequency resource(s) based on the received group ID, and receives, based on the descrambled time-frequency resource(s), the first system information sent by the base station.

If the third implementation is applied in step 505, in other words, the dedicated signaling carries the group ID, and the MIB or the SB carries the time-frequency resource(s) for the first system information, the UE may first read the time-frequency resource(s) carried in the MIB or the SB, and further receive, based on the time-frequency resource(s), the first system information sent by the base station. The group ID is used to descramble the first system information sent by the base station to the UE that requests the first system information.

Optionally, the time-frequency resource(s) may be replaced with the receiving time indication information, in other words, the base station does not send frequency domain information to the UE. When receiving the first system information, the UE first acquires a time range, a time point, or a time window according to the receiving time indication information, and receives the first system information according to the group ID and the receiving time indication information.

If the fourth implementation is applied in step 505, in other words, the dedicated signaling carries the group ID and the receiving time indication information for the first system information, the UE descrambles, based on the received group ID, time-frequency resource(s) indicated by the receiving time indication information, and receives, based on the descrambled time-frequency resource(s), the first system information sent by the base station. If the fifth implementation is applied in step 505, in other words, the dedicated signaling carries the group ID and the MIB or the SB carries the receiving time indication information for the first system information, the UE may first acquire the receiving time indication information carried in the MIB or the SB, and further receives, based on the time-frequency resource(s), the first system information sent by the base station.

When the first system information requested by the system information request includes the at least two pieces of system information, for example, includes the SI 1 and the SI 2, and the first system information carries a common group ID of the SI 1 and the SI 2, the UE may use the common group ID to descramble the time-frequency resource(s) corresponding to the first system information. Certainly, the SI 1 and the SI 2 may each correspond to one group ID, and this is not limited in this application.

In addition, a correspondence between a group ID and a paging period (paging) may be preconfigured for the UE. When the UE receives the group ID, the UE may acquire the corresponding paging period according to the correspondence. To be specific, when the paging period arrives, the UE receives a paging message sent by the base station and descrambles the received paging message by using the group ID.

The network-side device may further send a paging message to the UE based on the paging period. The paging message is used to indicate the UE to acquire, based on the paging message, last updated first system information. The paging message includes at least one of an index for the first system information that is last updated by the network-side device, content of the first system information, a VT for the first system information, or time-frequency resource(s) for the first system information. When the paging message carries the content of the first system information, the UE directly updates currently saved first system information. When the paging message carries the VT for the first system information, the UE may compare the received VT with a VT for the first system information currently saved by the UE. If the VTs are different, the UE determines that the content of the first system information has been updated and the UE clears content of the currently saved first system information. When the UE requires the first system information, the UE initiates the system information request to request new system information from the network-side device. When the paging message carries the time-frequency resource(s) for the first system information, the UE may acquire the time-frequency resource(s) for the first system information in the paging message, so that the UE receives the new first system information based on the new time-frequency resource(s).

Optionally, the paging message may further carry a common VT corresponding to the first system information. For example, the first system information includes the SI 3 and the SI 4. When receiving the paging message, the UE compares and determines that the common VT changes and learns that information content of the SI 3 and/or the SI 4 changes. The UE may further determine, based on scheduling information in the MIB or the SB sent by the network-side device, whether the information content of the SI 3 and/or the SI 4 changes. The scheduling information includes the VTs of the SI 3 and the SI 4. The UE may compare the VTs of the SI 3 and the SI 4 with VTs of currently saved SI 3 and/or SI 4 to determine whether the information content of the SI 3 and/or the SI 4 changes, and request to acquire the changed system information from the base station.

Optionally, when receiving the first system information, the UE may delete the group ID corresponding to the first system information. When the UE requires the first system information next time, the UE sends a system information request again to the base station to acquire updated information content of the first system information.

As described above, in the system information sending method provided in this embodiment of the present invention, when the UE needs to acquire any on-demand SI, namely, the first system information, the UE sends the system information request to the network-side device, and receives, from the network-side device, the group identifier allocated to the UE, or the group identifier and the time-frequency resource(s), or the group identifier and the receiving time indication information, so that the UE receives the first system information from the network-side device based on the group identifier and the acquired time-frequency resource(s) or the receiving time indication information. The network-side device allocates the group identifier to the UE that requests the first system information. When there are a large quantity of UEs requesting the first system information, the network-side device does not send, as the network-side device does in the prior art, the dedicated signaling to each UE that requests the first system information. In this application, the network-side device sends the group identifier, or the group identifier and the time-frequency resource(s), or the group identifier and the receiving time indication information to the UE, so that the network-side device may send the first system information to the UE in a multicast manner, and the UE may receive the first system information from the network-side device based on the group identifier and the acquired time-frequency resource(s). This reduces network time-frequency resource(s) occupied when the network-side device sends the dedicated signaling carrying the system information to each UE.

Figure 6:
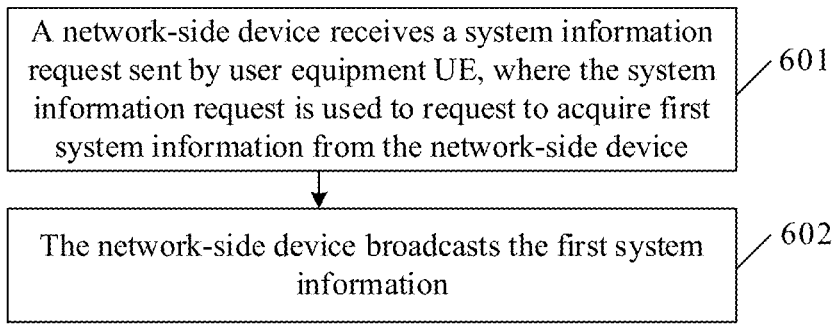
FIG. 6 is a schematic flowchart of a method for sending system information according to an embodiment of the present invention.

An embodiment of the present invention further provides a method for sending system information. The following describes an example in which an NW side sends system information with a broadcast manner. For a network-side device, as shown in FIG. 6, the method includes the following steps.

601: The network-side device receives a system information request sent by user equipment UE, where the system information request is used to request to acquire first system information from the network-side device.

The network-side device may be a base station, and the first system information may be any on-demand SI.

602: The network-side device broadcasts the first system information.

For example, when the network-side device determines, based on a quantity of requests for requesting the first system information in a period of time, to broadcast the first system information, the network-side device broadcasts the first system information. Then, the UE that requests the first system information may receive and save the first system information, and UE interested in the first system information may also receive and save the first system information for future use. The network-side device does not need to send, as the network-side device does in the prior art, dedicated signaling for transmitting the first system information to each UE that requests the first system information, but sends the first system information with a broadcast manner. This saves network time-frequency resource(s).

Alternatively, when the network-side device determines, based on the quantity of requests for requesting the first system information in the period of time, to broadcast the first system information, the network-side device may firstly broadcast time-frequency resource(s) for the first system information, and then broadcast the first system information on the broadcast time-frequency resource(s), so that the UE that requesting the first system information receives and saves the first system information on the time-frequency resource(s) for the first system information broadcasted by the network-side device.

Alternatively, the network-side device may periodically broadcast time-frequency resource(s) or sending occasion(s) for the first system information. When the network-side device determines, based on the quantity of requests for requesting the first system information in a period of time, to broadcast the first system information, the network-side device selects a nearest time-frequency resource or a nearest sending occasion from a broadcasted periodic time-frequency resource(s) or a broadcasted sending occasion(s), to broadcast the first system information. The UE that requesting the first system information may select the nearest time-frequency resource or the nearest sending occasion from the periodic time-frequency resource(s) or the sending occasion(s) for the first system information broadcasted by the network-side device, to receive and save the first system information.

Figure 7:
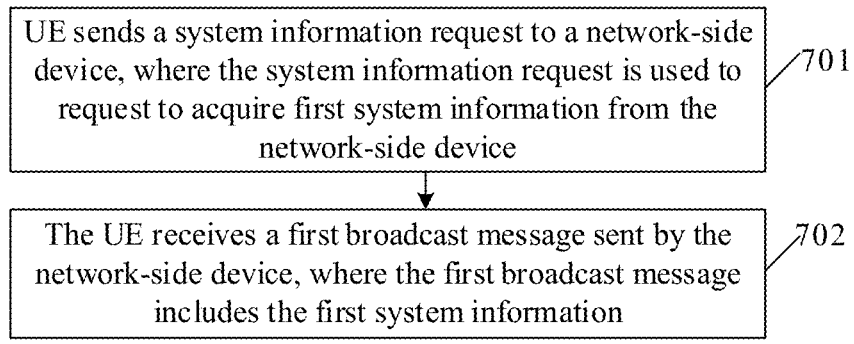
FIG. 7 is a schematic flowchart of a method for sending system information according to an embodiment of the present invention.

The following describes an example in which the NW side sends the system information with a broadcast manner. For the UE, as shown in FIG. 7, the method includes the following steps.

701: The UE sends a system information request to a network-side device, where the system information request is used to request to acquire the first system information from the network-side device.

702: The UE receives a first broadcast message sent by the network-side device, where the first broadcast message includes the first system information.

Alternatively, after receiving time-frequency resource(s) for the first system information broadcasted by the network-side device, the UE receives, on the time-frequency resource(s), the first system information broadcasted by the network-side device.

Figure 7A:
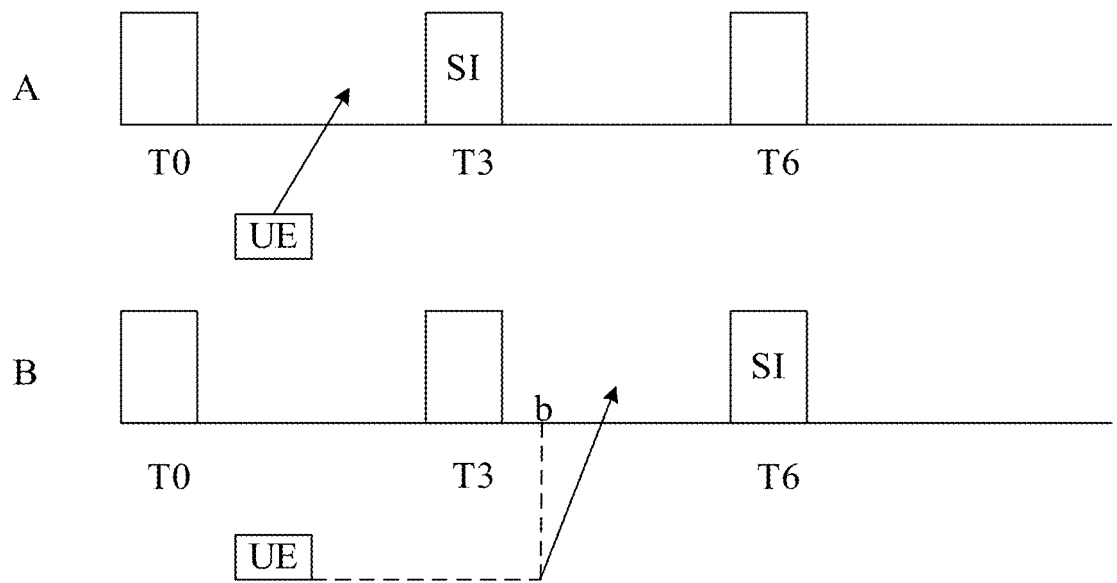
FIG. 7a is a schematic diagram of time-frequency resource(s) or a sending occasion(s) of acquiring system information by UE according to an embodiment of the present invention.

Alternatively, in case that the UE receives time-frequency resource(s) or sending occasion(s) for the first system information periodically broadcasted by the network-side device, if the UE needs to acquire the first system information, the UE sends a system information request to the network-side device, and selects a nearest time-frequency resource or a nearest sending occasion from the periodic time-frequency resource(s) or the sending occasion(s) for the first system information broadcasted by the network-side device, to receive and save the first system information. As shown in a part A of FIG. 7a, T0, T3, and T6 indicate the periodic time-frequency resource(s) or the sending occasion(s) for the first system information. When the UE needs to acquire the first system information in a time period between T0 and T3, the UE sends the system information request to the base station. The UE may receive, on a next periodic time-frequency resource(s) or on a next sending occasion T3, the first system information SI sent by the base station.

Alternatively, in case that the UE receives the time-frequency resource(s) or the sending occasion(s) for the first system information periodically broadcasted by the network-side device, if the UE needs to acquire the first system information, the UE first determines whether the UE receives the first system information on a next received time-frequency resource or on a next received sending occasion for the first system information. If the UE receives the first system information, the UE saves the first system information. If the UE does not receive the first system information, the UE sends a system information request to the network-side device, and receives and saves the first system information on a time frequency resource or on sending occasion(s) for the first system information periodically sent by the network-side device next-next time. As shown in a part B of FIG. 7a, T0, T3, and T6 indicate the periodic time-frequency resource(s) or the sending occasion(s) for the first system information. If the UE needs to acquire the first system information in a time period between T0 and T3, the UE may first wait for a period of time (represented by a dashed line in the part B of FIG. 7a) to determine whether the UE receives the first system information SI on time-frequency resource(s) or on sending occasion(s) received in a next period. If the UE receives the first system information SI, the UE saves the first system information SI. If the UE does not receive the first system information SI, the UE sends a system information request at a moment indicated by b, and receives the first system information SI on time-frequency resource(s) or sending occasion(s) indicated by a next period T6 of the base station.

The following further describes how the NW side sends the system information with a broadcast manner.

Figure 8:
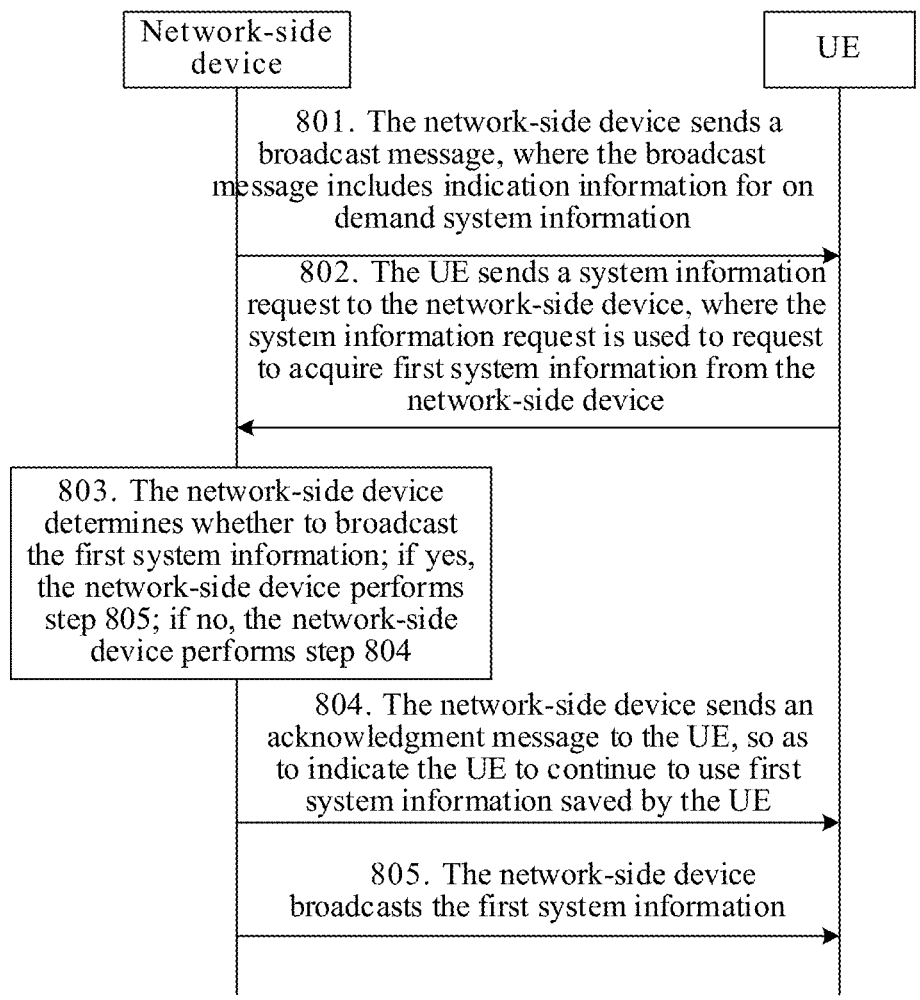
FIG. 8 is a schematic flowchart of a method for sending system information according to an embodiment of the present invention.

An embodiment of the present invention further provides a method for sending system information. The following describes an example in which an NW side sends system information with a broadcast manner. As shown in FIG. 8, the method includes the following steps.

801: A network-side device sends a broadcast message, where the broadcast message includes indication information for on-demand system information.

A manner of implementing step 801 is similar to that of step 501, and details are not described herein again. The first broadcast message in step 501 is equivalent to the broadcast message in step 801.

A difference from step 501 lies in that, the broadcast message in step 801 may further include time-frequency resource(s) or sending occasion(s) of SI, which is used to indicate the UE to acquire the SI based on the time-frequency resource(s) or the sending occasion(s). Optionally, the time-frequency resource(s) or the sending occasion(s) of the SI may be periodically broadcasted by the network-side device. The time-frequency resource(s) may be a system information window for sending the SI, and the sending occasion(s) may be a sending period.

Alternatively, the broadcast message in step 801 may further include monitoring duration of the SI, which is used to indicate the UE to save the SI if the UE receives the SI within the monitoring duration. If the UE does not receive the SI within the monitoring duration, the UE requests the network-side device to broadcast the SI.

802: The UE sends a system information request to the network-side device, where the system information request is used to request to acquire first system information from the network-side device.

A manner of sending the system information request by the UE to the network-side device in step 802 may be similar to that in step 502, and details are not described herein again.

If the broadcast message in step 801 includes the received time-frequency resource(s) or the received sending occasion(s) periodically broadcasted by the network-side device, the UE sends the system information request to the network-side device to request the first system information, and receives the first system information sent by the network-side device on a last received time-frequency resource or on a last received sending occasion.

Alternatively, if the broadcast message in step 801 includes the received time-frequency resource(s) or the received sending occasion(s) periodically broadcasted by the network-side device, the UE first determines whether the UE receives the first system information sent by the network-side device on the last received time-frequency resource or on the last received sending occasion. If the UE receives the first system information, the UE saves the first system information. If the UE does not receive the first system information, the UE sends a system information request to the network-side device to request the first system information.

If the broadcast message includes monitoring duration of on-demand SI and the UE needs to acquire any on-demand SI, namely, the first system information, the UE may first start a timer. A timer length is monitoring duration of the SI that needs to be acquired. Before the timer expires, the UE monitors whether the UE receives the SI sent by the network-side device. Optionally, the time-frequency resource(s) or the sending occasion(s) broadcasted by the network-side device and received by the UE may be used to receive the SI. If the UE receives the SI, the UE saves the SI and stops timer timing. If the UE does not receive the SI, the UE sends a system information request to the network-side device. The system information request may include an index for the first system information, or include an index and a VT for the first system information. It may be understood that, in an optional manner, the UE needs to acquire any on-demand SI, namely, the first system information, after the UE sends the system information request. It may be understood that, in an optional manner, before starting the timer, the UE may first determine, by using indication information broadcasted by the network-side device, whether the first system information is sent with a broadcast manner, and the UE starts a timer if determining that the first system information is sent with a broadcast manner.

803: The network-side device determines whether to broadcast the first system information; if the network-side device determines to broadcast the first system information, the network-side device performs step 805; if the network-side device determines not to broadcast the first system information, the network-side device performs step 804.

If the system information request includes the index and the VT for the first system information SI requested by the UE, a base station may first determine whether the VT for the first system information SI sent by the UE is the same as a VT of SI saved by the base station. If the VTs are the same, it indicates that content of the first system information currently saved by the UE is usable, step 804 may be directly performed. If the VTs are different, the base station determines that content of first system information on the base station side has been updated, and the base station needs to send the content of the new first system information to the UE. For example, if the index of the SI in the system information request sent by the UE is SI 3 and the VT is 3, when receiving the system information request, the base station determines, based on the index SI 3 of the SI, a VT of SI 3 currently saved by the base station. If the VT of the SI 3 saved by the base station is 3, the base station determines to send an ACK message to the UE, to indicate that the content of the SI 3 currently saved by the UE is valid. If the VT of the SI 3 saved by the base station is 4, it indicates that content of the SI 3 on the base station side has been updated, the base station needs to send the updated SI 3 to the UE.

804. The network-side device sends an acknowledgment message to the UE, so as to indicate the UE to continue to use the first system information saved by the UE.

The acknowledgment message may be an ACK message. It may be understood that when the system information request sent by the UE includes a plurality of indexes and VTs of SI, the ACK message sent by the network-side device needs to indicate an index of corresponding SI, so that the UE determines which system information does not need to be updated.

805: The network-side device broadcasts the first system information.

In an implementation, when the network-side device determines to broadcast the first system information, the network-side device broadcasts the first system information.

In another implementation, when the network-side device determines to broadcast the first system information, the network-side device first broadcasts the time-frequency resource(s) or the sending occasion(s) for the first system information, and then broadcasts the first system information, so that the UE receives, based on the received time-frequency resource(s) or the received sending occasion(s), the first system information sent by the network-side device.

In still another implementation, according to step 802, if the network-side device periodically broadcasts the time-frequency resource(s) or the sending occasion(s) for the first system information, and the UE needs to acquire the first system information, the UE requests the network-side device to send the first system information. In this case, the network-side device broadcasts the first system information, and the UE receives the first system information broadcast by the network-side device on a nearest time-frequency resource or on a nearest sending occasion after the UE requests the first system information.

In still another implementation, according to step 802, if the network-side device periodically broadcasts the time-frequency resource(s) or the sending occasion(s) for the first system information, and the UE does not receive the first system information on a last received time-frequency resource(s) or on a last received sending occasion when the UE needs to acquire the first system information, the UE requests the network-side device to send the first system information. In this case, the network-side device broadcasts the first system information, and the UE receives the first system information broadcast by the network-side device on the time-frequency resource(s) or on the sending occasion(s) received after the UE requests the first system information.

The first system information may include the index for the first system information, or include the index and the VT for the first system information, or include the index and the VT for the first system information, and a common VT of at least two pieces of system information.

Before broadcasting the first system information, the base station may scramble the first system information by using a radio network temporary identifier (RNTI). To distinguish an RNTI from an RNTI used by periodically sent SI, namely, important SI, the on-demand SI and the important SI may use different RNTIs. The RNTI of the on-demand SI may originally exist on the UE side, or may be broadcasted by the base station to the UE. This is not limited in this application.

When the UE requires the on-demand SI, the UE learns of, based on the indication information broadcasted by the base station, that the base station broadcasts the SI with a broadcast manner. For UE that does not save the SI but needs to acquire the SI, if the UE has started a timer and the timer does not expire, the UE receives and saves the SI, and stops timing of the timer. For UE that does not save the SI or does not require the SI (that is, the UE does not start the timer temporarily but is interested in the SI), if the UE receives the SI, the UE may receive and save the SI for future use.

When receiving the SI sent by the base station, the UE may determine, based on the VT carried in the SI, whether content of SI currently saved by the UE needs to be updated. Specifically, the UE may compare the VT of the received SI with a VT corresponding to the SI currently saved by the UE. If the VTs are the same, no update is required, and the UE continues to use the currently saved SI. If the VTs are different, the content of the SI is updated to the content of the SI received from the base station.

In addition, after the base station broadcasts the first system information, the base station needs to update the indication information broadcasted in step 801. For example, the base station updates the broadcasted indication information based on the broadcasted first system information.

When the indication information is a list, the base station may delete the indication information for the first system information from the list. For example, before the base station broadcasts the first system information, if the list includes indexes and VTs of the SI 1 and SI 2, as shown in Table 5, the indication information is as follows:

TABLE 5

| On-demand SI num | VT |
| --- | --- |
| SI 1 | 1 |
| SI 2 | 3 |

If the base station broadcasts the first system information SI 2, the base station needs to broadcast new indication information to the UE. An index and a VT of the broadcasted first system information SI 2 are deleted from the indication information, and the updated indication information is shown in Table 6:

TABLE 6

| On-demand SI num | VT |
| --- | --- |
| SI 1 | 1 |

Correspondingly, if the base station needs to cancel broadcasting the first system information SI 2, in other words, information content of the SI 2 remains unchanged, the base station may re-send the indication information shown in Table 7:

TABLE 7

| On-demand SI num | VT |
| --- | --- |
| SI 1 | 1 |
| SI 2 | Current VT |

When the indication information of the broadcast message is a bitmap, in other words, the bitmap is used to indicate the on-demand SI, a value of each bit in the bitmap is used to indicate whether SI corresponding to each bit needs to be acquired by the UE by sending a system information request. For example, the bitmap may be 0011, and the bits correspond to SI 1, SI 2, SI 3, and SI 4 in sequence. A bit value being 0 indicates that corresponding SI is not being broadcasted, and the UE needs to acquire the SI by sending a system information request. A bit value being 1 indicates that the corresponding SI is being broadcasted, and the UE may directly acquire time-frequency resource(s) of the SI based on scheduling information in the broadcast and receive the SI. When the base station has broadcasted the first system information SI 2, the base station needs to update the broadcasted bitmap to 0111. Correspondingly, if the base station cancels broadcasting the first system information SI2, the base station needs to update the broadcast bitmap to 0011 again.

When the UE needs to acquire the system information, the UE needs to read a latest bitmap to determine that a value of each bit in the bitmap is used to indicate whether SI corresponding to each bit needs to be acquired by the UE by sending the system information request. If the UE determines that the SI corresponding to each bit needs to be acquired by the UE by sending the system information request, the UE initiates the system information request. For details about specific steps, refer to the foregoing description.

It may be understood that a change in the bitmap may not be notified to the UE by using a paging message, and the UE reads the latest bitmap only when needing to acquire the system information.

An embodiment of this application further provides a technical solution, including: sending, by the network-side device, a paging message to the UE, where the paging message is used to indicate the UE to acquire last updated first system information based on the paging message, and the paging message includes at least one of an index for the first system information that is last updated by the network-side device, content of the first system information, a value tag value for the first system information, or time-frequency resource(s) for the first system information. Specifically, in a feasible design, the network-side device may send the paging message to the UE based on a paging period. The paging message is used to indicate the UE to acquire, based on the paging message, the last updated first system information. The paging message includes at least one of the index for the first system information that is last updated by the network-side device, the content of the first system information, a VT for the first system information, or the time-frequency resource(s) for the first system information. Specifically, the index for the first system information may be indicated by a list, or by a corresponding bit in a bitmap. When the paging message carries the content of the first system information, the UE directly updates currently saved first system information. When the paging message carries the VT for the first system information, the UE may compare the received VT with a VT for the first system information currently saved by the UE. If the VTs are different, the UE determines that the content of the first system information has been updated and the UE clears content of the currently saved first system information. When the UE requires the first system information, the UE initiates the system information request to request new system information from the network-side device. When the paging message carries the time-frequency resource(s) for the first system information, the UE may acquire the time-frequency resource(s) for the first system information in the paging message, so that the UE receives the new first system information based on the new time-frequency resource(s).

Optionally, the paging message may further carry a common VT corresponding to the first system information. For example, the first system information includes the SI 3 and the SI 4. When receiving the paging message, the UE compares and determines that the common VT changes and learns that information content of the SI 3 and/or the SI 4 changes. The UE may further determine, based on scheduling information in an MIB or an SB sent by the network-side device, whether the information content of the SI 3 and/or the SI 4 changes. The scheduling information includes VTs of the SI 3 and the SI 4. The UE may compare the VTs of the SI 3 and the SI 4 with VTs of currently saved SI 3 and/or SI 4 to determine whether the information content of the SI 3 and/or the SI 4 changes, and request to acquire the changed system information from the base station.

This application further provides the following embodiments.

Embodiment 1: A method for sending system information is provided, including: receiving, by a network-side device, a system information request sent by user equipment UE, where the system information request is used to request to acquire first system information from the network-side device; sending, by the network-side device, a group identifier to the UE, or sending, by the network-side device, a group identifier and time-frequency resource(s) for the first system information to the UE; and sending, by the network-side device, the first system information to the UE.

Embodiment 2: According to the method in the embodiment 1, the method further includes: sending, by the network-side device, a first broadcast message, where the first broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate that system information corresponding to each bit needs to be acquired by the UE by sending a system information request.

Embodiment 3: According to the method in the embodiment 1 or 2, the sending, by the network-side device, a group identifier to the UE includes: preconfiguring, by the network-side device for the UE, a correspondence between the group identifier and the time-frequency resource(s), and sending, by the network-side device, dedicated signaling to the UE that requests the first system information, where the dedicated signaling includes the group identifier, so as to indicate the UE to acquire, according to the correspondence, the time-frequency resource(s) corresponding to the group identifier and then receive the first system information. The sending, by the network-side device, a group identifier and time-frequency resource(s) for the first system information to the UE includes: sending, by the network-side device, dedicated signaling to the UE that requests the first system information, where the dedicated signaling includes the group identifier and the time-frequency resource(s) for the first system information, so as to indicate the UE to receive the first system information by using the group identifier and the time-frequency resource(s); or sending, by the network-side device, dedicated signaling to the UE that requests the first system information, where the dedicated signaling includes the group identifier, and sending a second broadcast message to the UE, where the second broadcast message includes the time-frequency resource(s) for the first system information, so as to indicate the UE to receive the first system information by using the group identifier and the time-frequency resource(s).

Embodiment 4: According to the network-side device in any one of the embodiments 1 to 3, each system information sent on demand corresponds to one group identifier, or at least two pieces of system information sent on demand correspond to a same common group identifier. The first system information includes the index for the first system information, or includes the index and the value tag for the first system information, or includes the index and the value tag for the first system information, and the common value tag of the at least two pieces of system information. The first system information may further include a validity time applied for the first system information. The validity time is used to indicate the UE to re-acquire the content for the first system information from the network-side device when a validity time for acquiring the first system information expires.

Embodiment 5: A network-side device is provided, including: a receiving unit, configured to receive a system information request sent by user equipment UE, where the system information request is used to request to acquire first system information from the network-side device; and a sending unit, configured to send a group identifier to the UE, or the network-side device sends a group identifier and time-frequency resource(s) for the first system information to the UE. The sending unit is further configured to send the first system information to the UE.

Embodiment 6: According to the network-side device in the embodiment 5, the sending unit is further configured to send a first broadcast message, where the first broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate that system information corresponding to each bit needs to be acquired by the UE by sending a system information request.

Embodiment 7: According to the network-side device in the embodiment 5 or 6, the sending unit is configured to preconfigure, for the UE, a correspondence between the group identifier and the time-frequency resource(s). The network-side device sends dedicated signaling to the UE that requests the first system information, where the dedicated signaling includes the group identifier, so as to indicate the UE to acquire, according to the correspondence, the time-frequency resource(s) corresponding to the group identifier and then receive the first system information. Alternatively, the sending unit is configured to send dedicated signaling to the UE that requests the first system information, where the dedicated signaling includes the group identifier and the time-frequency resource(s) for the first system information, so as to indicate the UE to receive the first system information by using the group identifier and the time-frequency resource(s). Alternatively, the sending unit is configured to send dedicated signaling to the UE that requests the first system information, where the dedicated signaling includes the group identifier, and send a second broadcast message to the UE, where the second broadcast message includes the time-frequency resource(s) for the first system information, so as to indicate the UE to receive the first system information by using the group identifier and the time-frequency resource(s).

Embodiment 8: According to the network-side device in any one of the embodiments 5 to 7, each system information sent on demand corresponds to one group identifier, or at least two pieces of system information sent on demand correspond to a same common group identifier. The first system information includes the index for the first system information, or includes the index and the value tag for the first system information, or includes the index and the value tag for the first system information, and the common value tag of the at least two pieces of system information. The first system information may further include a validity time applied for the first system information. The validity time is used to indicate the UE to re-acquire the content of the first system information from the network-side device when a validity time for acquiring the first system information expires.

Embodiment 9: A method for sending system information is provided, including: sending, by user equipment UE, a system information request to a network-side device, where the system information request is used to request to acquire first system information from the network-side device; receiving, by the UE, a group identifier sent by the network-side device, or receiving, by the UE, a group identifier and time-frequency resource(s) for the first system information that are sent by the network-side device; and receiving, by the UE based on the group identifier and the acquired time-frequency resource(s) for the first system information, the first system information sent by the network-side device.

Embodiment 10: According to the method in the embodiment 9, before the sending, by UE, a system information request, the method further includes: receiving, by the UE, a first broadcast message sent by the network-side device, where the first broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate that system information corresponding to each bit needs to be acquired by the UE by sending a system information request.

Embodiment 11: According to the method in the embodiment 9 or 10, the receiving, by the UE, a group identifier sent by the network-side device includes: receiving, by the UE, dedicated signaling sent by the network-side device, where the dedicated signaling includes the group identifier. The receiving, by the UE based on the group identifier and the acquired time-frequency resource(s) for the first system information, the first system information sent by the network-side device includes: acquiring, by the UE, the time-frequency resource(s) for the first system information according to a correspondence between a group identifier and a preconfigured time-frequency resource(s); and receiving, by the UE, based on the time-frequency resource(s) for the first system information, the first system information sent by the network-side device.

Embodiment 12: According to the method in the embodiment 9 or 10, the receiving, by the UE, a group identifier and time-frequency resource(s) for the first system information that are sent by the network-side device includes: receiving, by the UE, dedicated signaling sent by the network-side device, where the dedicated signaling includes the group identifier and the time frequency resource for the first system information; or receiving, by the UE, dedicated signaling sent by the network-side device, where the dedicated signaling includes the group identifier, and receiving a second broadcast message sent by the network-side device, where the second broadcast message includes the time frequency resource for the first system information.

Embodiment 13: User equipment UE is provided, including: a sending unit, configured to send a system information request to a network-side device, where the system information request is used to request to acquire first system information from the network-side device; and a receiving unit, configured to receive a group identifier sent by the network-side device, or the UE receives a group identifier and time-frequency resource(s) for the first system information that are sent by the network-side device. The receiving unit is further configured to receive, based on the group identifier and the acquired time-frequency resource(s) for the first system information, the first system information sent by the network-side device.

Embodiment 14: According to the UE in the embodiment 13, the receiving unit is further configured to receive a first broadcast message sent by the network-side device, where the first broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate that system information corresponding to each bit needs to be acquired by the UE by sending a system information request.

Embodiment 15: According to the UE in the embodiment 13 or 14, the receiving unit is configured to receive dedicated signaling sent by the network-side device, where the dedicated signaling includes the group identifier. Alternatively, the UE further includes an acquiring unit, configured to acquire the time-frequency resource(s) for the first system information according to a correspondence between a group identifier and a preconfigured time-frequency resource(s).

The receiving unit is configured to acquire the time-frequency resource(s) for the first system information according to the correspondence between the group identifier and the preconfigured time-frequency resource(s).

Embodiment 16: According to the UE in the embodiment 13 or 14, the receiving unit is configured to receive dedicated signaling sent by the network-side device, where the dedicated signaling includes the group identifier and the time frequency resource for the first system information. Alternatively, the receiving unit is configured to receive dedicated signaling sent by the network-side device, where the dedicated signaling includes the group identifier, and receive a second broadcast message sent by the network-side device, where the second broadcast message includes the time frequency resource for the first system information.

Embodiment 17: A method for sending system information is provided, including: receiving, by a network-side device, a system information request sent by user equipment UE, where the system information request is used to request to acquire first system information from the network-side device; and broadcasting, by the network-side device, the first system information.

Embodiment 18: According to the method in the embodiment 17, the method further includes: sending, by the network-side device, a broadcast message, where the broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate that system information corresponding to each bit needs to be acquired by the UE by sending a system information request.

Embodiment 19: According to the method in the embodiment 17 or 18, the broadcast message further includes time-frequency resource(s) or sending occasion(s) for the system information, where the time-frequency resource or the sending occasion(s) is used by the UE to acquire the system information on the time-frequency resource or on the sending occasion(s). Alternatively, the broadcast message further includes monitoring duration for the system information, where the monitoring duration is used to indicate the UE to save the system information if the UE receives the system information within the monitoring duration, and if the UE does not receive the system information within the monitoring duration, to indicate the UE to request the network-side device to broadcast the system information.

Embodiment 20: A network-side device is provided, including: a receiving unit, configured to receive a system information request sent by user equipment UE, where the system information request is used to request to acquire first system information from the network-side device; and a broadcast unit, configured to broadcast the first system information.

Embodiment 21: According to the network-side device in the embodiment 20, the broadcast unit is further configured to send a broadcast message, where the broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate that system information corresponding to each bit needs to be acquired by the UE by sending a system information request.

Embodiment 22: According to the network-side device in the embodiment 20 or 21, the broadcast message further includes time-frequency resource(s) or sending occasion(s) for the system information, where the time-frequency resource(s) or the sending occasion(s) is used by the UE to acquire the system information on the time-frequency resource(s) or on the sending occasion(s). Alternatively, the broadcast message further includes monitoring duration for the system information, where the monitoring duration is used to indicate the UE to save the system information if the UE receives the system information within the monitoring duration, and if the UE does not receive the system information within the monitoring duration, to indicate the UE to request the network-side device to broadcast the system information.

Embodiment 23: A method for sending system information is provided, including: sending, by user equipment UE, a system information request to a network-side device, where the system information request is used to request to acquire first system information from the network-side device; and receiving, by the UE, a first broadcast message sent by the network-side device, where the first broadcast message includes the first system information.

Embodiment 24: According to the method in the embodiment 23, the method further includes: receiving, by the UE, a second broadcast message sent by the network-side device, where the second broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate that system information corresponding to each bit needs to be acquired by the UE by sending a system information request.

Embodiment 25: According to the method in the embodiment 24, the second broadcast message further includes time-frequency resource(s) or sending occasion(s) for the system information. The receiving, by the UE, a first broadcast message sent by the network-side device includes: receiving, by the UE based on the time-frequency resource(s) or the sending occasion(s), the first broadcast message sent by the network-side device.

Embodiment 26: According to the method in the embodiment 24 or 25, the second broadcast message further includes monitoring duration for the system information. Before the sending, by UE, a system information request to a network-side device, the method further includes: starting, by the UE, a timer when the UE determines that the UE needs to acquire the first system information, where a timer length is the monitoring duration for the first system information; and determining, by the UE, whether the UE receives the first system information within the monitoring duration, and if it is determined that the UE does not receive the first system information within the monitoring duration, the UE determines that the UE needs to send the system information request to the network-side device.

Embodiment 27: User equipment UE is provided, including:

a sending unit, configured to send a system information request to a network-side device, where the system information request is used to request to acquire first system information from the network-side device; and a receiving unit, configured to receive a first broadcast message sent by the network-side device, where the first broadcast message includes the first system information.

Embodiment 28: According to the UE in the embodiment 27, the receiving unit is further configured to receive a second broadcast message sent by the network-side device, where the second broadcast message includes indication information for on-demand system information, and the indication information includes indication information for the first system information. The indication information includes an index for the system information, or the indication information includes an index and a value tag for the system information, or the indication information includes an index and a value tag for the system information, and a common value tag of at least two pieces of system information, where the value tag is used by the UE to determine whether content of the system information changes. Alternatively, the indication information includes a bitmap, and a value of each bit in the bitmap is used to indicate that system information corresponding to each bit needs to be acquired by the UE by sending a system information request.

Embodiment 29: According to the UE in the embodiment 28, the second broadcast message further includes time-frequency resource(s) or sending occasion(s) for the system information. The receiving unit is configured to receive, based on the time-frequency resource(s) or the sending occasion(s), the first broadcast message sent by the network-side device.

Embodiment 30: According to the UE in the embodiment 28 or 29, the second broadcast message further includes monitoring duration for the system information. Before sending the system information request to the network-side device, the UE further includes a timing unit, configured to start a timer when the UE determines that the UE needs to acquire the first system information, where a timer length is the monitoring duration for the first system information; and a determining unit, configured to determine whether the UE receives the first system information within the monitoring duration, and if it is determined that the UE does not receive the first system information within the monitoring duration, determine that the UE needs to send the system information request to the network-side device.

As described above, in the system information sending method provided in the embodiments of the present invention, when the UE requests to acquire the first system information, the network-side device does not send, as the network-side device does in the prior art, the dedicated signaling to each UE that requests the first system information, but broadcasts the first system information. In this way, the UE that requires the first system information can receive the first system information, and other UEs that are interested in the first system information can also receive and save the first system information. This reduces network resources occupied when the network-side device sends the dedicated signaling to each UE.

The foregoing mainly describes the solution provided in the embodiments of the present invention from a perspective of interaction between network elements. It can be understood that, to implement the foregoing functions, network elements, such as a base station and UE, include corresponding hardware structures and/or software modules for performing the functions. A person skilled in the art should be easily aware that units and algorithm steps in the examples described with reference to the embodiments disclosed in this specification may be implemented in a form of hardware or in a form of a combination of hardware and computer software in the present invention. Whether the functions are performed by hardware or software and hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, the network-side device, the UE, and the like may be divided into function modules based on the foregoing method examples. For example, each function module may be acquired through division for a corresponding function, or two or more functions may be integrated into one processing module. The integrated module may be implemented in a form of hardware, or may be implemented in a form of a software function module. It should be noted that the module division in the embodiments of the present invention is an example, is merely logical function division, and may be another division manner during actual implementation.

Figure 9:
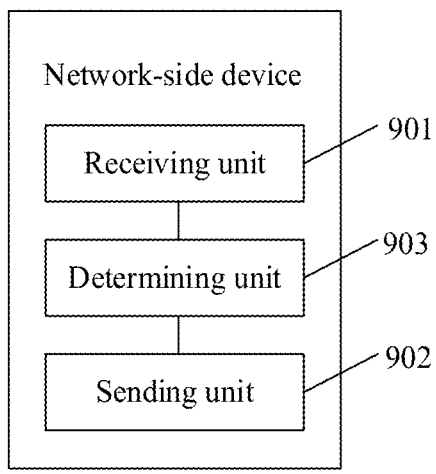
FIG. 9 is a schematic diagram of a structure of a network-side device according to an embodiment of the present invention.

FIG. 9 shows a possible schematic diagram of a structure of the network-side device in the foregoing embodiments if each function module is acquired through division for a corresponding function. The network-side device includes a receiving unit 901, a sending unit 902, and a determining unit 903. The receiving unit 901 is configured to support the network-side device in executing a process 301 shown in FIG. 3. The sending unit 902 is configured to support the network-side device in executing processes 302 and 303 shown in FIG. 3, and processes 501, 504, 505, and 506 shown in FIG. 5. The determining unit 903 is configured to support the network-side device in executing a process 503 shown in FIG. 5. All related content of each step in the foregoing method embodiment may be referenced in function descriptions of a corresponding function module, and details are not described herein again.

Figure 10:
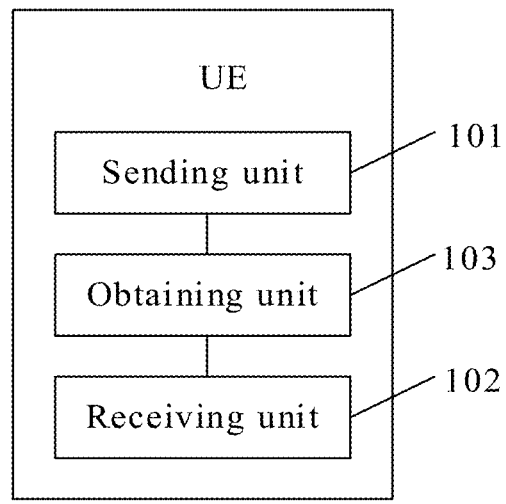
FIG. 10 is a schematic diagram of a structure of UE according to an embodiment of the present invention.

FIG. 10 shows a possible schematic diagram of a structure of the UE in the foregoing embodiments if each function module is acquired through division for a corresponding function. The UE includes a sending unit 101, a receiving unit 102, and an acquiring unit 103. The sending unit 101 is configured to support the UE in executing a process 401 shown in FIG. 4 and a process 502 shown in FIG. 5. The receiving unit 102 is configured to support the UE in executing processes 402 and 403 shown in FIG. 4, and a process 507 shown in FIG. 5. The acquiring unit 103 is configured to support the UE in acquiring time-frequency resource(s) of system information according to a correspondence between a group ID and time-frequency resource(s). All related content of each step in the foregoing method embodiment may be referenced in function descriptions of a corresponding function module, and details are not described herein again.

Figure 11:
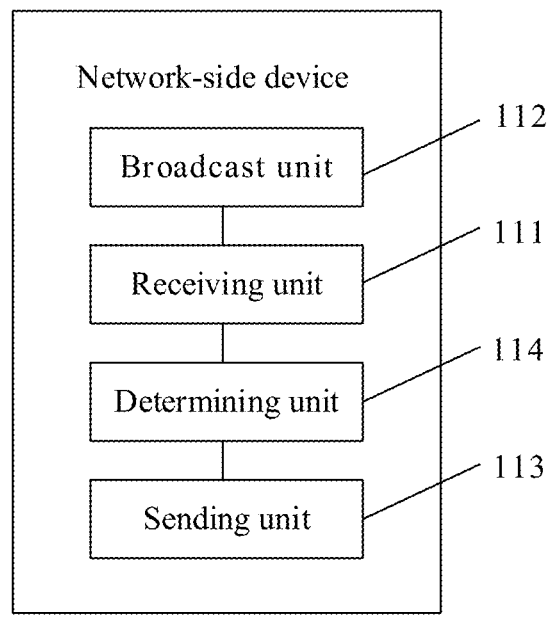
FIG. 11 is a schematic diagram of a structure of a network-side device according to an embodiment of the present invention.

FIG. 11 shows a possible schematic diagram of another structure of the network-side device in the foregoing embodiments if each function module is acquired through division for a corresponding function. The network-side device includes a receiving unit 111, a broadcast unit 113, and a determining unit 114. The receiving unit is configured to support the network-side device in executing a process 601 shown in FIG. 6. The broadcast unit is configured to support the network-side device in executing a process 602 shown in FIG. 6. The sending unit is configured to support the network-side device in executing processes 801, 804, and 805 shown in FIG. 8. The determining unit is configured to support the network-side device in executing a process 803 shown in FIG. 8. All related content of each step in the foregoing method embodiment may be referenced in function descriptions of a corresponding function module, and details are not described herein again.

Figure 12:
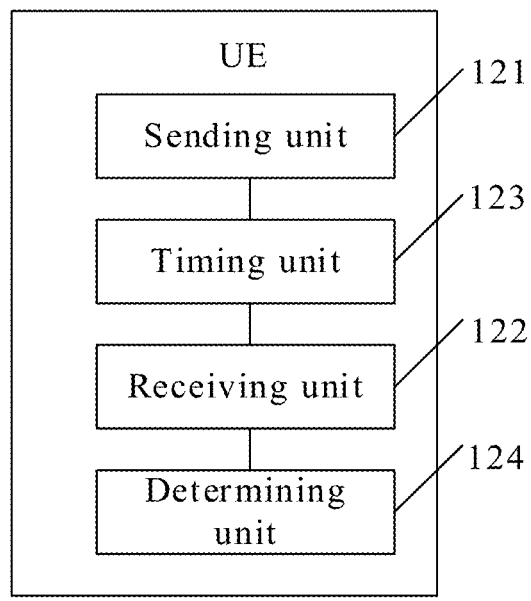
FIG. 12 is a schematic diagram of a structure of UE according to an embodiment of the present invention.

FIG. 12 shows a possible schematic diagram of another structure of the UE in the foregoing embodiments if each function module is acquired through division for a corresponding function. The UE includes a sending unit 121, a receiving unit 122, a timing unit 123, and a determining unit 124. The sending unit is configured to support the UE in executing a process 701 shown in FIG. 7 and a process 802 shown in FIG. 8. The receiving unit is configured to support the UE in executing a process 702 shown in FIG. 7. The timing unit is configured to support the UE in executing the timer method described in FIG. 8, for example, the method described in step 802. The determining unit is configured to support the UE in executing the fourth paragraph in step 805 in FIG. 8, that is, determine whether to update the SI. All related content of each step in the foregoing method embodiment may be referenced in function descriptions of a corresponding function module, and details are not described herein again.

Figure 13:
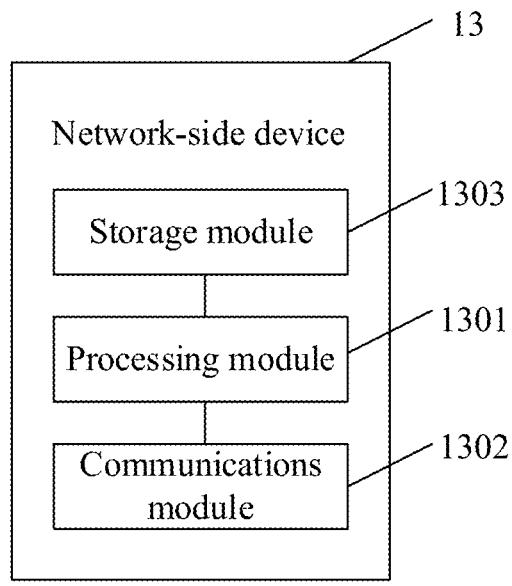
FIG. 13 is a schematic diagram of a structure of a network-side device according to an embodiment of the present invention.

FIG. 13 shows a possible schematic diagram of a structure of the network-side device in the foregoing embodiments if a unit that integrates functions is used. A network-side device 13 includes a processing module 1301 and a communications module 1302. The processing module 1301 is configured to control and manage an action of the network-side device. For example, the processing module 1301 is configured to support the network-side device in executing a process 503 shown in FIG. 5 and a process 803 shown in FIG. 8. The communications module 1302 is configured to support communication between the network-side device and another network entity, for example, communication with UE, to be specific, communication with a function module or a network entity shown in FIG. 4, FIG. 5, FIG. 7, and FIG. 8. The communications module 1302 is specifically configured to support the network-side device in executing processes 301, 302, and 303 shown in FIG. 3, processes 501, 504, 505, and 506 shown in FIG. 5, processes 601 and 602 shown in FIG. 6, and processes 801, 804, and 805 shown in FIG. 8. The network-side device may further include a storage module 1303, configured to store program code and data of a base station.

The processing module 1301 may be a processor or a controller, for example, may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. The processing module 1301 may implement or execute various example logical blocks, modules, and circuits described with reference to content disclosed in the present invention. Alternatively, the processor may be a combination that implements a computing function, for example, a combination of one or more microprocessors, or a combination of the DSP and a microprocessor. The communications module 1302 may be a transceiver, a transceiver circuit, a communications interface, or the like. The storage module 1303 may be a memory.

When the processing module 1301 is a processor, the communications module 1302 is a transceiver, and the storage module 1303 is a memory, the network-side device in the embodiments of the present invention may be the network-side device shown in FIG. 13.

Figure 14:
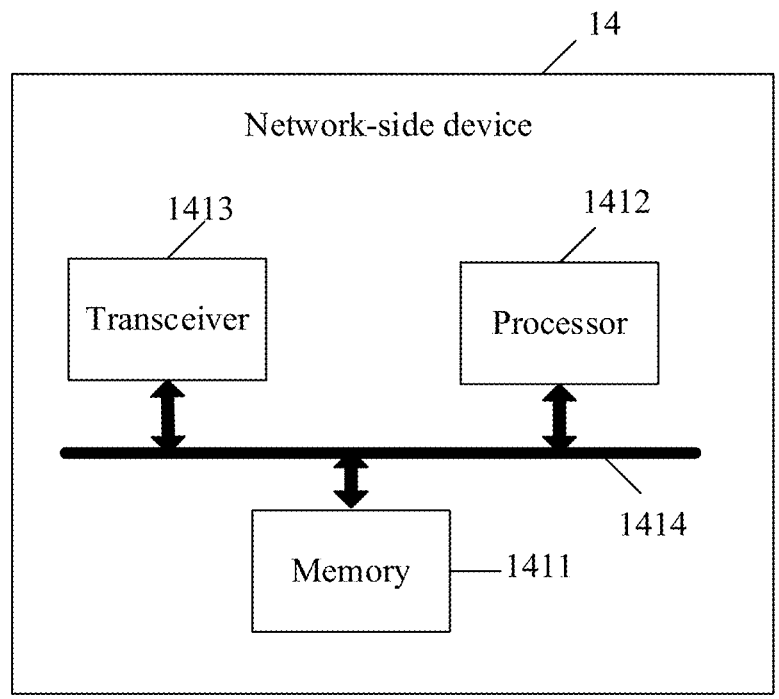
FIG. 14 is a schematic diagram of a structure of a network-side device according to an embodiment of the present invention.

Referring to FIG. 14, a network-side device 14 includes a processor 1412, a transceiver 1413, a memory 1411, and a bus 1414. The transceiver 1413, the processor 1412, and the memory 1411 are interconnected by using the bus 1414. The bus 1414 may be a peripheral component interconnect (PCI) bus, an extended industry standard architecture (EISA) bus, or the like. The bus may be classified into an address bus, a data bus, a control bus, or the like. For ease of representation, only one thick line is used to represent the bus in FIG. 14, but this does not mean that there is only one bus or only one type of bus.

Figure 15:
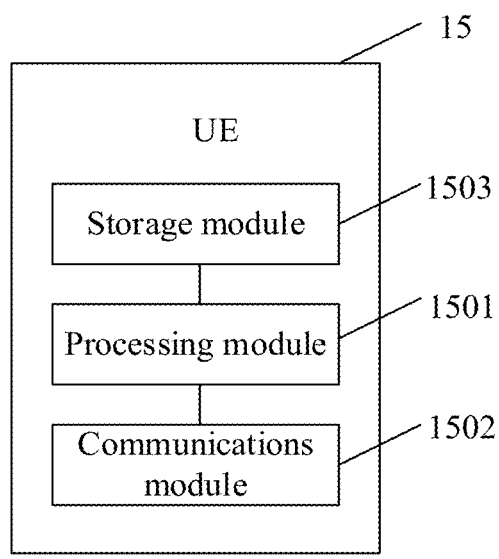
FIG. 15 is a schematic diagram of a structure of UE according to an embodiment of the present invention.

FIG. 15 shows a possible schematic diagram of a structure of the UE in the foregoing embodiments if a unit that integrates functions is used. UE 15 includes a processing module 1501 and a communications module 1502. The processing module 1501 is configured to control and manage an action of the UE. For example, the processing module 1501 is configured to support the UE in determining, based on a received value tag, whether to update system information saved by the UE. The communications module 1502 is configured to support communication between the UE and another network entity, for example, communication with a network-side device, to be specific, communication with a function module or a network entity shown in FIG. 3, FIG. 5, FIG. 6, and FIG. 8. The communications module 1502 is specifically configured to support the UE in executing processes 401, 402, and 403 shown in FIG. 4, processes 502 and 507 shown in FIG. 5, processes 701 and 702 shown in FIG. 7, and a process 802 shown in FIG. 8. The UE may further include a storage module 1503, configured to store program code and data of the UE.

The processing module 1501 may be a processor or a controller, for example, may be a CPU, a general-purpose processor, a digital signal processor (DSP), an application-specific integrated circuit (ASIC), an FPGA or another programmable logic device, a transistor logic device, a hardware component, or any combination thereof. The processing module 1501 may implement or execute various example logical blocks, modules, and circuits described with reference to content disclosed in the present invention. Alternatively, the processor may be a combination that implements a computing function, for example, a combination of one or more microprocessors, or a combination of the DSP and a microprocessor. The communications module 1502 may be a transceiver, a transceiver circuit, a communications interface, or the like. The storage module 1503 may be a memory.

Figure 16:
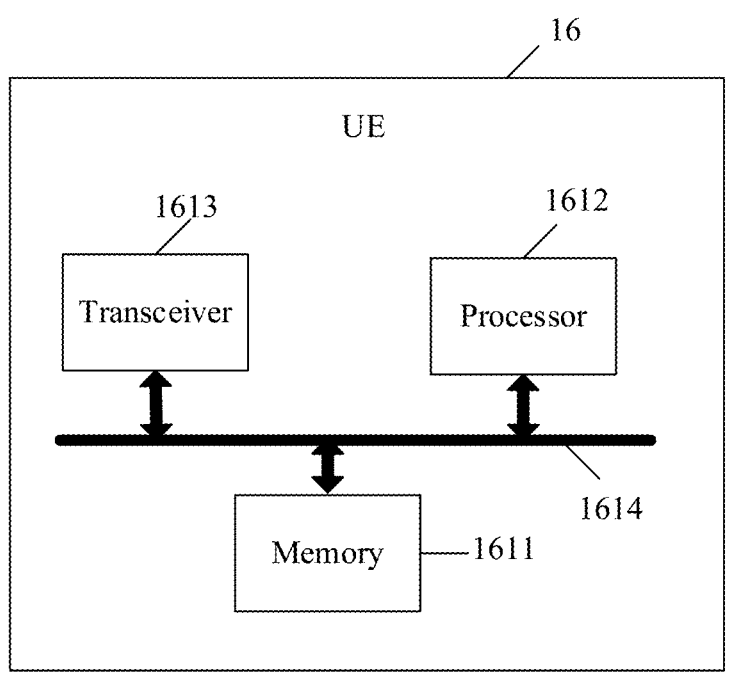
FIG. 16 is a schematic diagram of a structure of UE according to an embodiment of the present invention.

When the processing module 1501 is a processor, the communications module 1502 is a transceiver, and the storage module 1503 is a memory, the UE in the embodiments of the present invention may be the UE shown in FIG. 16.

Referring to FIG. 16, UE 16 includes a processor 1612, a transceiver 1613, a memory 1611, and a bus 1614. The transceiver 1613, the processor 1612, and the memory 1611 are interconnected by using the bus 1614. The bus 1614 may be a peripheral component interconnect PCI bus, an extended industry standard architecture EISA bus, or the like. The bus may be classified into an address bus, a data bus, a control bus, or the like. For ease of representation, only one thick line is used to represent the bus in FIG. 16, but this does not mean that there is only one bus or only one type of bus.

An embodiment of the present invention further provides a communications system, including the network-side device and the UE in the embodiments in FIG. 3, FIG. 4, and FIG. 5. The network-side device may be configured to execute processes 301, 302, and 303 shown in FIG. 3, and processes 501, 503, 504, 505, and 506 shown in FIG. 5. The UE may be configured to execute processes 401 and 402 shown in FIG. 4, and processes 502 and 507 shown in FIG. 5. For specific implementations of the network-side device, refer to the implementations of the steps in FIG. 3 and FIG. 5. For specific implementation of the UE, refer to the implementations of the steps in FIG. 4 and FIG. 5.

An embodiment of the present invention further provides a communications system, including the network-side device and the UE in the embodiments in FIG. 6, FIG. 7, and FIG. 8. The network-side device may be configured to execute processes 601 and 602 shown in FIG. 6, and processes 801, 803, 804, and 805 shown in FIG. 8. The UE may be configured to execute processes 701 and 702 shown in FIG. 7, and a process 802 shown in FIG. 8. For specific implementations of the network-side device, refer to the implementations of the steps in FIG. 6 and FIG. 8. For specific implementation of the UE, refer to the implementations of the steps in FIG. 7 and FIG. 8.

An embodiment of the present invention further provides a communications system, including the network-side device in the method embodiments in FIG. 3 and FIG. 5. The network-side device may be configured to execute processes 301, 302, and 303 shown in FIG. 3, and processes 501, 503, 504, 505, and 506 shown in FIG. 5. For specific implementations of the network-side device, refer to specific implementations in the method embodiments in FIG. 3 and FIG. 5.

An embodiment of the present invention further provides a communications system, including the network-side device in the method embodiments in FIG. 6 and FIG. 8. The network-side device may be configured to execute processes 601 and 602 shown in FIG. 6, and processes 801, 803, 804, and 805 shown in FIG. 8. For specific implementations of the network-side device, refer to specific implementations in the method embodiments in FIG. 6 and FIG. 8.

An embodiment of the present invention further provides a system chip, including an input/output interface, at least one processor, a memory, and a bus. The input/output interface may be configured to execute processes 301, 302, and 303 shown in FIG. 3, and processes 501, 504, 505, and 506 shown in FIG. 5. The processor is configured to execute a process 503 shown in FIG. 5. The memory is configured to store an application program and data, for example, store indication information and system information. The input/output interface, the at least one processor, and the memory are connected to the bus. The system chip may be a system on chip (SoC), or the like.

An embodiment of the present invention further provides a system chip, including an input/output interface, at least one processor, a memory, and a bus. The input/output interface may be configured to execute processes 401 and 402 shown in FIG. 4, and processes 502 and 507 shown in FIG. 5. The memory is configured to store an application program and data. The input/output interface and the memory are connected to the bus.

An embodiment of the present invention further provides a system chip, including an input/output interface, at least one processor, a memory, and a bus. The input/output interface may be configured to execute processes 601 and 602 shown in FIG. 6, and processes 801, 804, and 805 shown in FIG. 8. The processor is configured to execute a process 803 shown in FIG. 8. The memory is configured to store an application program and data. The input/output interface, the at least one processor, and the memory are connected to the bus.

An embodiment of the present invention further provides a system chip, including an input/output interface, at least one processor, a memory, and a bus. The input/output interface may be configured to execute processes 701 and 702 shown in FIG. 7, and a process 802 shown in FIG. 8. The memory is configured to store an application program and data. The input/output interface, the at least one processor, and the memory are connected to the bus.

An embodiment of the present invention further provides a computer storage medium, configured to store computer software instructions used by the network-side device shown in FIG. 3 and FIG. 5. The computer storage medium includes a program designed to execute processes 301, 302, and 303 shown in FIG. 3, and processes 501, 503, 504, 505, and 506 shown in FIG. 5.

An embodiment of the present invention further provides a computer storage medium, configured to store computer software instructions used by the UE shown in FIG. 4 and FIG. 5. The computer storage medium includes a program designed to execute processes 401 and 402 shown in FIG. 4, and processes 502 and 507 shown in FIG. 5.

An embodiment of the present invention further provides a computer storage medium, configured to store computer software instructions used by the network-side device shown in FIG. 6 and FIG. 8. The computer storage medium includes a program designed to execute processes 601 and 602 shown in FIG. 6, and processes 801, 803, 804, and 805 shown in FIG. 8.

An embodiment of the present invention further provides a computer storage medium, configured to store computer software instructions used by the UE shown in FIG. 7 and FIG. 8. The computer storage medium includes a program designed to execute processes 701 and 702 shown in FIG. 7, and a process 802 shown in FIG. 8.

Method or algorithm steps described in combination with the content disclosed in the present invention may be implemented by hardware, or may be implemented by a processor by executing software instruction. The software instruction may include a corresponding software module. The software module may be stored in a random access memory (RAM), a flash memory, a read-only memory (ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions in the present invention shall fall within the protection scope of the present invention.

What is claimed is:

1. A method for sending acquiring system information (SI), the method comprising:
    receiving, by a terminal, a broadcast message from a network device, wherein the broadcast message indicates that the SI is not being periodically broadcast by the network device and comprises a plurality of sending occasions for on-demand sending of the SI;
    in response to receiving the broadcast message, sending, by the terminal, a system information request to the network device for acquiring the SI;
    selecting, by the terminal, a nearest sending occasion out of the plurality of sending occasions for acquiring the SI, wherein the nearest sending occasion is the earliest sending occasion that occurs after the terminal sends the system information request; and
    acquiring, by the terminal, the SI on the selected sending occasion.

2. The method according to claim 1, wherein the system information request includes an index of the SI.

3. The method according to claim 1, wherein the system information request includes a bitmap, wherein the bitmap includes a bit, and wherein a value of the bit indicates that the terminal is requesting to acquire the SI from the network device.

4. The method according to claim 3, wherein the value of the bit is set as 1.

5. The method according to claim 1, wherein the terminal is in an idle state.

6. An apparatus for acquiring system information (SI), the apparatus comprising:
    at least one processor; and
    a non-transitory memory storing instructions, wherein the instructions, when executed by the at least one processor, facilitate:
    receiving a broadcast message from a network device, wherein the broadcast message indicates that the SI is not being periodically broadcast by the network device and comprises a plurality of sending occasions for on-demand sending of the SI;
    in response to receiving the broadcast message, sending a system information request to the network device for acquiring the SI;
    selecting a nearest sending occasion out of the plurality of sending occasions for acquiring the SI, wherein the nearest sending occasion is the earliest sending occasion that occurs after sending the system information request; and
    acquiring the SI on the selected sending occasion.

7. The apparatus according to claim 6, wherein the system information request includes an index of the SI.

8. The apparatus according to claim 6, wherein the system information request includes a bitmap, wherein the bitmap includes a bit, and wherein a value of the bit indicates that the apparatus is requesting to acquire the SI from the network device.

9. The apparatus according to claim 8, wherein the value of the bit is set as 1.

10. A non-transitory computer-readable storage medium having processor-executable instructions stored thereon, wherein the processor-executable instructions, when executed, facilitate:
    receiving, by a terminal, a broadcast message from a network device, wherein the broadcast message indicates that system information (SI) is not being periodically broadcast by the network device and comprises a plurality of sending occasions for on-demand sending of the SI;
    in response to receiving the broadcast message, sending, by the terminal, a system information request to the network device for acquiring the SI;
    selecting, by the terminal, a nearest sending occasion out of the plurality of sending occasions for acquiring the SI, wherein the nearest sending occasion is the earliest sending occasion that occurs after the terminal sends the system information request; and
    acquiring, by the terminal, the SI on the selected sending occasion.

11. The non-transitory computer-readable storage medium according to claim 10, wherein the system information request includes an index of the SI.

12. The non-transitory computer-readable storage medium according to claim 10, wherein the system information request includes a bitmap, wherein the bitmap includes a bit, and wherein a value of the bit indicates that the terminal is requesting to acquire the SI from the network device.

13. The non-transitory computer-readable storage medium according to claim 12, wherein the value of the bit is set as 1.

* * * * *

UNITED STATES PATENT AND TRADEMARK OFFICE
CERTIFICATE OF CORRECTION

PATENT NO. : 11,102,706 B2
APPLICATION NO. : 16/528022
DATED : August 24, 2021
INVENTOR(S) : Geng et al.

It is certified that error appears in the above-identified patent and that said Letters Patent is hereby corrected as shown below:

In the Claims

Column 51, Line 29:
"1. A method for sending acquiring system information"
Should read:
-- 1. A method for acquiring system information --.

Signed and Sealed this
Twelfth Day of July, 2022

Katherine Kelly Vidal
*Director of the United States Patent and Trademark Office*